United States Patent
Kim

(10) Patent No.: US 10,126,014 B2
(45) Date of Patent: Nov. 13, 2018

(54) HEAT EXCHANGER FOR CONDENSING GAS BOILER

(71) Applicant: Kyungdong Navien Co., Ltd., Pyeongtaek, Gyeonggi-do (KR)

(72) Inventor: Young Mo Kim, Gyeonggi-do (KR)

(73) Assignee: Kyungdong Navien Co., Ltd., Pyeongtaek, Gyeonggi-do (KR)

( * ) Notice: Subject to any disclaimer, the term of this patent is extended or adjusted under 35 U.S.C. 154(b) by 30 days.

(21) Appl. No.: 15/258,486

(22) Filed: Sep. 7, 2016

(65) Prior Publication Data

US 2016/0377320 A1    Dec. 29, 2016

Related U.S. Application Data

(63) Continuation of application No. PCT/KR2015/002500, filed on Mar. 16, 2015.

(30) Foreign Application Priority Data

Mar. 17, 2014  (KR) .......................... 10-2014-0030877

(51) Int. Cl.
*F28D 7/10* (2006.01)
*F24H 1/44* (2006.01)
(Continued)

(52) U.S. Cl.
CPC .............. *F24H 1/445* (2013.01); *F24H 1/32* (2013.01); *F24H 1/48* (2013.01); *F24H 1/52* (2013.01);
(Continued)

(58) Field of Classification Search
CPC ... F24H 1/445; F24H 1/32; F24H 1/48; F24H 1/52; F24H 8/00; F24H 9/0015; F24H 9/0026; F24H 9/146; F28D 9/0043; F28D 9/0093; F28F 3/042; F28F 3/046; Y02B 30/102
(Continued)

(56) References Cited

U.S. PATENT DOCUMENTS 2,053,590 A  *  9/1936  Whiteley .................. F24H 1/28
                                                    110/162
4,747,447 A  *  5/1988  Scanlan .................. F24H 1/121
                                                    165/104.14
(Continued)

FOREIGN PATENT DOCUMENTS

KR        10-0645734 B1    11/2006
KR        10-0846294 B1    7/2008
(Continued)

*Primary Examiner* — Justin Jonaitis
(74) *Attorney, Agent, or Firm* — Mintz Levin Cohn Ferris Glovsky and Popeo, P.C.; Kongsik Kim; Carolina Säve

(57) ABSTRACT

A heat exchanger comprising a heat exchange unit in which heat is exchanged between combustion gas caused by a burner for combusting a mixture and first/second heating mediums, and heating medium flow channels through which the first/second heating mediums flow and a combustion gas flow channel through which the combustion gas flows are alternately formed adjacent to each other in spaces between a plurality of plates and a combustion gas discharge unit through which the combustion gas having passed through the heat exchange unit is discharged is provided.

17 Claims, 21 Drawing Sheets

(51) Int. Cl.
F24H 8/00 (2006.01)
F24H 1/32 (2006.01)
F24H 1/48 (2006.01)
F24H 9/00 (2006.01)
F24H 9/14 (2006.01)
F28F 3/04 (2006.01)
F28D 9/00 (2006.01)
F24H 1/52 (2006.01)

(52) U.S. Cl.
CPC ............ *F24H 8/00* (2013.01); *F24H 9/0015* (2013.01); *F24H 9/0026* (2013.01); *F24H 9/146* (2013.01); *F28D 9/0043* (2013.01); *F28D 9/0093* (2013.01); *F28F 3/042* (2013.01); *F28F 3/046* (2013.01); *Y02B 30/102* (2013.01)

(58) Field of Classification Search
USPC ........................................ 165/140, 143, 144
See application file for complete search history.

(56) References Cited

U.S. PATENT DOCUMENTS

| | | | | |
|---|---|---|---|---|
| 4,751,913 A | * | 6/1988 | Vetter | F23L 15/04 122/18.2 |
| 4,807,588 A | * | 2/1989 | Bentley | F24H 3/105 126/110 R |
| 4,896,411 A | * | 1/1990 | Dempsey | F24H 3/105 29/890.039 |
| 2007/0209606 A1 | * | 9/2007 | Hamada | F24H 1/43 122/18.1 |
| 2008/0061160 A1 | * | 3/2008 | Ootomo | F24H 1/40 237/8 R |
| 2009/0133642 A1 | * | 5/2009 | Asakura | F22D 1/10 122/32 |
| 2009/0133861 A1 | * | 5/2009 | Kim | F24H 1/48 165/140 |
| 2010/0101755 A1 | * | 4/2010 | Morini | F24H 1/40 165/53 |
| 2011/0114300 A1 | * | 5/2011 | Kim | F24H 1/40 165/181 |
| 2011/0155079 A1 | * | 6/2011 | Matsunaga | F24H 1/40 122/15.1 |
| 2014/0174382 A1 | * | 6/2014 | Oohigashi | F24H 8/00 122/18.4 |
| 2014/0202442 A1 | * | 7/2014 | Haydock | F24H 8/00 126/112 |
| 2015/0104725 A1 | * | 4/2015 | Yang | H01M 8/04067 429/423 |
| 2015/0362214 A1 | * | 12/2015 | Park | F23L 15/04 431/215 |

FOREIGN PATENT DOCUMENTS

KR 10-2009-0130941 A 12/2009
KR 10-2010-0066633 A 6/2010

* cited by examiner

Prior Art

HEAT EXCHANGER FOR CONDENSING GAS BOILER

CROSS-REFERENCE TO RELATED APPLICATIONS

This application is a continuation application of International Application No. PCT/KR2015/002500 filed on Mar. 16, 2015, which claims priority to Korean Application No. 10-2014-0030877 filed on Mar. 17, 2014. The applications are incorporated herein by reference.

TECHNICAL FIELD

The present disclosure relates to a heat exchanger of a condensing gas boiler, and more particularly, to a heat exchanger of a condensing gas boiler, which is integrally provided with a sensible-heat exchange unit for applying heat to heating water and a latent-heat exchange unit for heating direct water.

BACKGROUND ART

A gas boiler may be classified into a condensing gas boiler and a non-condensing gas boiler depending on whether or not absorbing condensation latent heat of combustion gas generated in a burner therein.

The condensing gas boiler is a boiler collecting condensation latent heat of water vapor contained in combustion gas, and is provided with a separate latent-heat exchange unit for collecting latent heat.

FIG. 1 is a diagram illustrating a downstream type condensing gas boiler among conventional condensing gas boilers. As shown in FIG. 1, the conventional condensing gas boiler is configured with an expansion tank 3 storing heating water that flows in through a circulating heating water inflow pipe 1, a circulating pump 4 circulating the heating water discharged through a circulating heating water discharge pipe 2 connected to the expansion tank 3, a latent-heat exchange unit 5 exchanging heat of the heating water being pressure delivered by the circulating pump 4, a sensible-heat exchange unit 6 transferring heat energy of a burner 7 to the heating water that is primarily preheated through the latent-heat exchange unit 5, a three way valve 10 supplying the heating water to a heating water supply pipe 8 when performing a heating operation and to a hot water supply heat exchange unit 9 when performing a hot water supply operation, and the hot water supply heat exchange unit 9 heating direct water to supply hot water to a user when performing the hot water supply operation.

An operation process of the conventional condensing gas boiler shown in FIG. 1 will be described.

When an indoor space is heated, heating water of which heat is transferred to a heating required zone flows in the expansion tank 3 via the circulating heating water inflow pipe 1, and the heating water discharged from the expansion tank 3 to the circulating heating water discharge pipe 2 is supplied to the latent-heat exchange unit 5 via the circulating pump 4 to exchange heat with combustion gas while passing a heat exchange pipe 5a installed at the latent-heat exchange unit 5 such that temperature of the heating water is primarily raised. At this point, condensed water being generated is discharged to an outside through a condensed water outlet 13.

Also, the heating water of which the temperature is raised in the latent-heat exchange unit 5 secondarily exchanges heat with the combustion gas through the sensible-heat exchange unit 6 to raise the temperature of the heating water, and then is supplied to a heating required zone through the heating water supply pipe 8 via the three way valve 10.

In a hot water supply operation, heating water being heated while sequentially passing the latent-heat exchange unit 5 and the sensible-heat exchange unit 6 is supplied to the hot water supply heat exchange unit 9 via the three way valve 10 to exchange heat with direct water that flows in through a direct water inlet pipe 11, and the direct water becomes hot water to be discharged through a hot water supply pipe 12 and to be supplied to the user.

The above described conventional condensing gas boiler is disclosed in Registered Korean Patent No. 10-0976032.

The above described conventional condensing gas boiler, however, heats direct water using the hot water supply heat exchange unit 9 to produce hot water such that it has problems in that a heating of the direct water is a time-consuming process and also thermal efficiency is degraded.

In addition, because the sensible-heat exchange unit 6 and the latent-heat exchange unit 5 are respectively manufactured using a separate heat exchange pipe, there are problems in that a manufacturing cost is high and a manufacturing process is complicated.

SUMMARY

To address the above described problems, an object of the present disclosure is to provide a heat exchanger of a condensing gas boiler which is provided with a heating sensible-heat exchange unit and a heating latent-heat exchange unit which exchange heat between combustion gas and heating water, and a direct water heat exchange unit exchanging heat between the combustion gas and direct water, and thus is capable of preheating the direct water when hot water is used to rapidly supply the hot water and improving thermal efficiency by allowing the heating latent-heat exchange unit and the direct water heat exchange unit to absorb condensation latent heat of the combustion gas.

Another object of the present disclosure is to provide a heat exchanger of a condensing gas boiler capable of being manufactured through a simplified manufacturing process and lowering a manufacture cost by integrally forming a heating sensible-heat exchange unit, a heating latent-heat exchange unit, and a direct water heat exchange unit at a single plate and bonding such a single plate in a plural number.

To attain the above described object, a heat exchanger of the present disclosure includes heat exchange units 1100, 1200, and 1300 configured to exchange heat between combustion gas generated at a burner 70 burning a mixture and first and second heating media, and in which a heating medium flow channel and a combustion gas flow channel are alternately formed to be adjacent to each other in each of spaces between a plurality of plates 110, 120, 210, 220, 310, and 320, wherein the first and second heating media flow through the heating medium flow channel, and the combustion gas flows through the combustion gas flow channel; and a combustion gas discharge unit 700 configured to discharge the combustion gas that passed the heat exchange units 1100, 1200, and 1300, wherein the heat exchange units 1100, 1200, and 1300 are configured with a first heat exchange unit 1100 including a first heating medium sensible heat flow channel that is formed between a pair of plates facing each other so as to absorb sensible heat of the combustion gas to heat the first heating medium, a second heat exchange unit 1200 including a first heating medium latent heat flow channel that is formed between a pair of plates facing each other to be communicated with the first heating medium sensible heat flow channel of the first heat exchange unit 1100 so as to absorb latent heat of the combustion gas to heat the first heating medium, and a third heat exchange unit 1300 including a second heating medium flow channel that is formed between a pair of plates facing each other so as to absorb the latent heat of the combustion gas to heat the second heating medium, and wherein the first to third heat exchange units 1100, 1200, and 1300 are integrally formed by a pair of plates facing each other so as to form the heating medium flow channel inside the first to third heat exchange units 1100, 1200, and 1300.

The first heat exchange unit 1100, the second heat exchange unit 1200, and the third heat exchange unit 1300 may be sequentially provided along a flow direction of the combustion gas generated at the burner.

The plurality of plates 110, 120, 210, 220, 310, and 320 may be configured with a first end plate portion 100 configuring one side of the heat exchanger 1000, a second end plate portion 300 configuring the other side of the heat exchanger 1000, and a plurality of middle plate portions 200 provided between the first end plate portion 100 and the second end plate portion 300, and the first heating medium sensible heat flow channel, the first heating medium latent heat flow channel, and the second heating medium flow channel may be formed in each of inner spaces of the first end plate portion 100, the middle plate portion 200, and the second end plate portion 300, wherein the first end plate portion 100 may be configured with a first outer side plate 110 and a first inner side plate 120 which come into bonding contact with each other at edge circumferences thereof, the middle plate portion 200 may be configured with a first middle plate 210 and a second middle plate 220 which come into bonding contact with each other at edge circumferences thereof, and the second end plate portion 300 may be configured with a second inner side plate 310 and a second outer side plate 320 which come into bonding contact with each other at edge circumferences thereof, and wherein a first heating medium sensible heat flow channel and a first heating medium latent heat flow channel of the second end plate portion 300 may be communicated with each other, and may be separated from the second heating medium flow channel.

The first heating medium may be heating water supplied to a heating required zone, and may flow in a heating water inlet hole 111c formed at the first outer side plate 110, sequentially pass heating water passing holes 121c, 121d, 211c, 211d, 221c, 221d, 311c, and 311d, which are formed at positions corresponding to the first inner side plate 120, the first and second middle plates 210 and 220, the second inner side plate 310, and the heating water inlet hole 111c, respectively, to be undergone heat exchange in the second heat exchange unit 1200, and then a flow direction of the first heating medium may be switched to an opposite direction by means of the second outer side plate 320 and the heating water of the switched flow direction may be undergone heat exchange while passing a heating medium flow channel formed at the first heat exchange unit 1100 and then may be discharged through a heating water outlet hole 111d formed at the first outer side plate 110, and the second heating medium may be direct water for supplying hot water to a user, and may flow in a direct water inlet hole 111a formed at the first outer side plate 110 to sequentially pass direct water passing holes 121a, 211a, and 221a, which are formed at positions corresponding to the first inner side plate 120, the first and second middle plates 210 and 220, the second inner side plate 310, and the direct water passing hole 111a, and then a flow direction of the second heating medium may be switched to an opposite direction by means of the second outer side plate 320 and the direct water of the switched flow direction may sequentially pass hot water passing holes 311b, 221b, 211b, and 121b, which are formed at the second inner side plate 310, the second and first middle plates 220 and 210, and the first inner side plate 120, respectively, and then may be discharged to a hot water supply heat exchange unit through a hot water outlet hole 111b of the first outer side plate 110 formed at positions corresponding to the hot water passing holes 311b, 221b, 211b, and 121b.

A flow channel connecting portion 329 may be formed at a position corresponding to a heating water passing hole 311d of the second inner side plate 310 in a space between the second inner side plate 310 and the second outer side plate 320, so as to connect a first heating medium sensible heat flow channel of the third heat exchange unit 1300 and a first heating medium latent heat flow channel of the second heat exchange unit 1200 to each other.

Lower sensible heat flow channel protruding portions 322, 312, 222, 212, 122, and 112 may be horizontally formed at positions corresponding to the second outer side plate 320, the second inner side plate 310, the second middle plate 220, the first middle plate 210, the first inner side plate 120, and the first outer side plate 110, respectively, an end of an upper part of the flow channel connecting portion 329 may be connected in a space between lower sensible heat flow channel protruding portions 322 and 312 of the second outer side plate 320 and the second inner side plate 310, and the first heating medium having the switched flow direction by means of the lower sensible heat flow channel protruding portion 322 of the second outer side plate 320 may flow in a space between lower sensible heat flow channel protruding portions 122 and 112 of the first inner side plate 120 and the first outer side plate 110 via a lower sensible heat flow channel that is a space between lower sensible heat flow channel protruding portions 222 and 212 of the second middle plate 220 and the first middle plate 210.

Occluded portions 312a, 222a, 212a, and 122a and through holes 312b, 222b, 212b, and 122b may be formed at both ends of each of the lower sensible heat flow channel protruding portions 312, 222, 212, and 122, respectively, wherein the lower sensible heat flow channel protruding portions 312, 222, 212, and 122 may be formed at the second inner side plate 310, the second middle plate 220, the first middle plate 210, and the first inner side plate 120, respectively, and, in the plurality of middle plate portions 200, the occluded portion and the through hole may be formed at the same position at a pair of plates facing each other, respectively, so as to form the combustion gas flow channel, and the occluded portion and the through hole may be formed to be opposite to each other at a pair of plates facing each other so as to form the first heating medium sensible heat flow channel, and thus the lower sensible heat flow channel may have a zigzag shape.

Both ends of the lower sensible heat flow channel protruding portion 112 of the first outer side plate 110 may be occluded, a sensible heat flow channel connecting portion 113 may be vertically formed at an opposite side end of the through hole 122b in the lower sensible heat flow channel protruding portion 112, and an upper part of the sensible heat flow channel connecting portion 113 may be connected to an upper sensible heat flow channel having a flow direction opposite that of the lower sensible heat flow channel.

First upper flow channel through holes 123, 213, 223, and 313 and second upper flow channel through holes 124, 214, 224, and 314 may be formed at both ends of an upper part of each of the lower sensible heat flow channel protruding portions 122, 212, 222, 312, and 322, respectively, and the upper sensible heat flow channel may be configured with a flow channel in which the first upper flow channel through holes 123, 213, 223, and 313 are connected to each other and a flow channel in which the second upper flow channel through holes 124, 214, 224, and 314 are connected to each other.

A first upper sensible heat flow channel protruding portion 114 may be formed over the lower sensible heat flow channel protruding portion 112 at the first outer side plate 110, wherein one end of the first upper sensible heat flow channel protruding portion 114 may be occluded and the heating water outlet hole 111d may be formed at the other end thereof, and a second upper sensible heat flow channel protruding portion 324 having both ends being occluded may be formed over the lower sensible heat flow channel protruding portion 322 at the second outer side plate 320, and thus a flow direction of the first heating medium flowing through the first upper flow channel through holes 123, 213, 223, and 313 may be opposite that of the first heating medium flowing through the second upper flow channel through holes 124, 214, 224, and 314.

The direct water inlet hole 111a and the direct water passing holes 121a, 211a, 221a, and 311a may be formed at one side lower part of the third heat exchange unit 1300 and the hot water outlet hole 111b and the hot water passing holes 121b, 211b, 221b, and 311b may be formed at the other side upper part thereof, wherein the one side lower part may be diagonally opposite the other side upper part, and the heating water passing holes 121c, 121d, 211c, 211d, 221c, 221d, 311c, and 311d may be configured with first heating water passing holes 121c, 211c, 221c, and 311c and second heating water passing holes 121d, 211d, 221d, and 311d which are diagonally formed at one side lower part of the second heat exchange unit 1200 and the other side upper part thereof.

One side of the first heating medium latent heat flow channel and the other side thereof may be formed to be communicated with the first heating water passing holes 121c, 211c, 221c, and 311c and the second heating water passing holes 121d, 211d, 221d, and 311d, and one side of the second heating medium flow channel and the other side thereof may be formed to be communicated with the direct water passing holes 121a, 211a, 221a, and 311a, and the hot water passing holes 121b, 211b, 221b, and 311b.

Combustion gas communicating holes 128, 218, 228, 318, and 328 may be formed below the first inner side plate 120, the first middle plate 210, the second middle plate 220, the second inner side plate 310, and the second outer side plate 320, wherein the combustion gas, which passed the first to third heat exchangers 1100, 1200, and 1300, may pass the combustion gas communicating holes 128, 218, 228, 318, and 328, the combustion gas discharge unit 700 may be configured with a space between the second outer side plate 320 and an exhaust plate 400 that is provided in rear of the second outer side plate 320 and spaced apart therefrom, and the combustion gas, which sequentially passes the combustion gas flow channel and the combustion gas communicating holes 128, 218, 228, 318, and 328, may be discharged through the space between the second outer side plate 320 and the exhaust plate 400.

A condensed water outlet 650 may be provided at the first outer side plate 110 and may be communicated with the combustion gas communicating holes 128, 218, 228, 318, and 328 to discharge condensed water generated by condensation of the combustion gas.

The plurality of plates 110, 120, 210, 220, 310, and 320 may come into bonding contact with adjacent plates at edge circumferences thereof, and the first heating medium sensible heat flow channel, the first heating medium latent heat flow channel, and the second heating medium flow channel may be formed by a contact of flat portions of the adjacent plates and an irregular portion and a protruding portion which are formed at positions facing each other of the respective plates.

The irregular portion may be configured with first irregular portions 115, 125, 215, 225, 315, and 325 for forming the first heating medium latent heat flow channel, and second irregular portions 116, 126, 216, 226, 316, and 326 for forming the second heating medium flow channel.

The irregular portions formed at adjacent plates among the plurality of plates 110, 120, 210, 220, 310, and 320 may be symmetrically formed to cross against each other in a zigzag pattern.

In accordance with the heat exchanger of the present disclosure, a heating sensible-heat exchange unit, a heating latent-heat exchange unit, and a direct water heat exchange unit are integrally formed at a single plate and a plurality of such plates are bonded to each other, and thus direct water is primarily heated before being supplied to a hot water supply heat exchange unit so that hot water may be rapidly supplied and thermal efficiency may be improved.

Also, the heating sensible-heat exchange unit for exchanging heat of heating water is provided with an upper sensible heat flow channel and a lower sensible heat flow channel and these flow channels circulate forward and backward directions of the heat exchanger, thereby increasing a heat exchange time to improve thermal efficiency.

In addition, irregular portions and protruding portions, which are formed at each plate, may be integrally formed and such integrally manufactured plates are bonded to each other, and thus the heat exchanger may be manufactured by a simplified manner.

Additionally, the upper sensible heat flow channel has a structure surrounding a combustion space so that a separate configuration for surrounding an outer wall of the combustion space is not needed, and heating water of the upper sensible heat flow channel absorbs heat radiated from the combustion space to an outward direction so that thermal efficiency is improved.

DETAILED DESCRIPTION

Hereinafter, a configuration and an action with respect to a preferred embodiment of the present disclosure will be described in detail as follows with reference to the accompanying drawings.

<Condensing Gas Boiler System>

Figure 1:
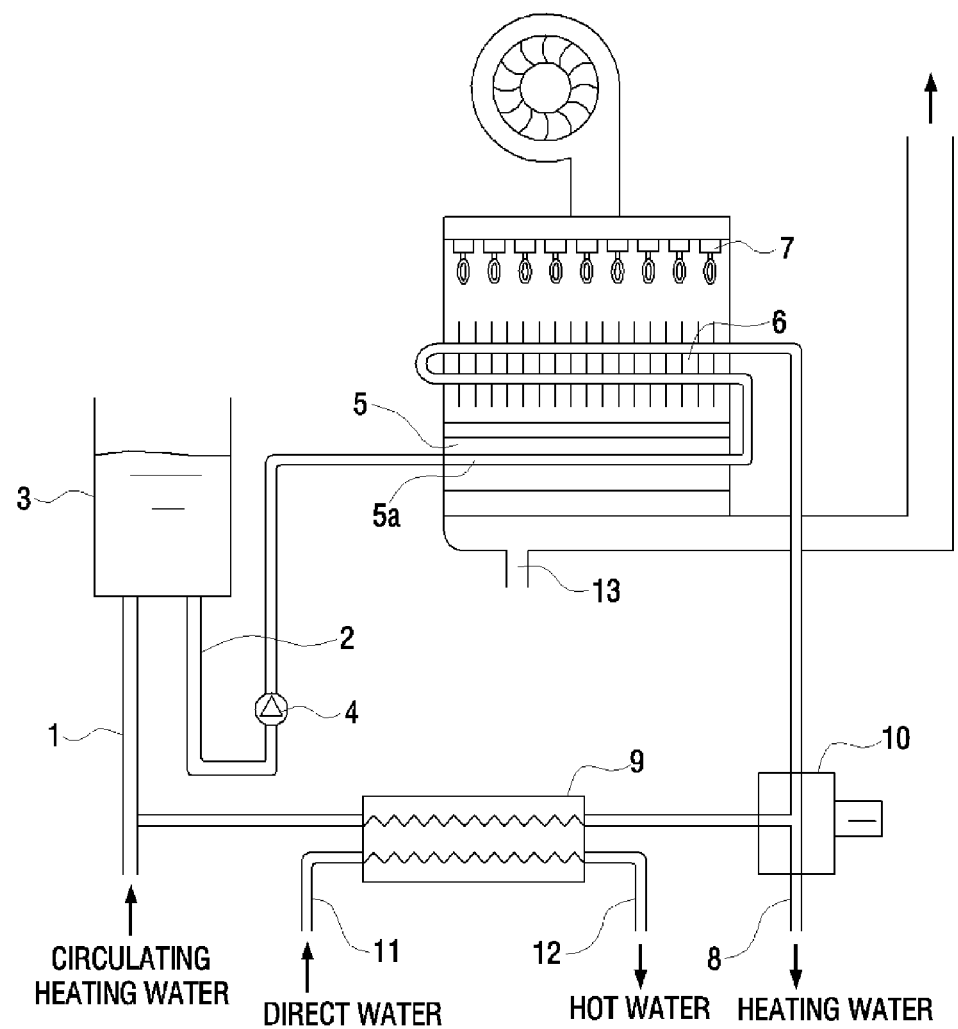
FIG. 1 is a diagram illustrating a downstream type condensing gas boiler among conventional condensing gas boilers.
Figure 2:
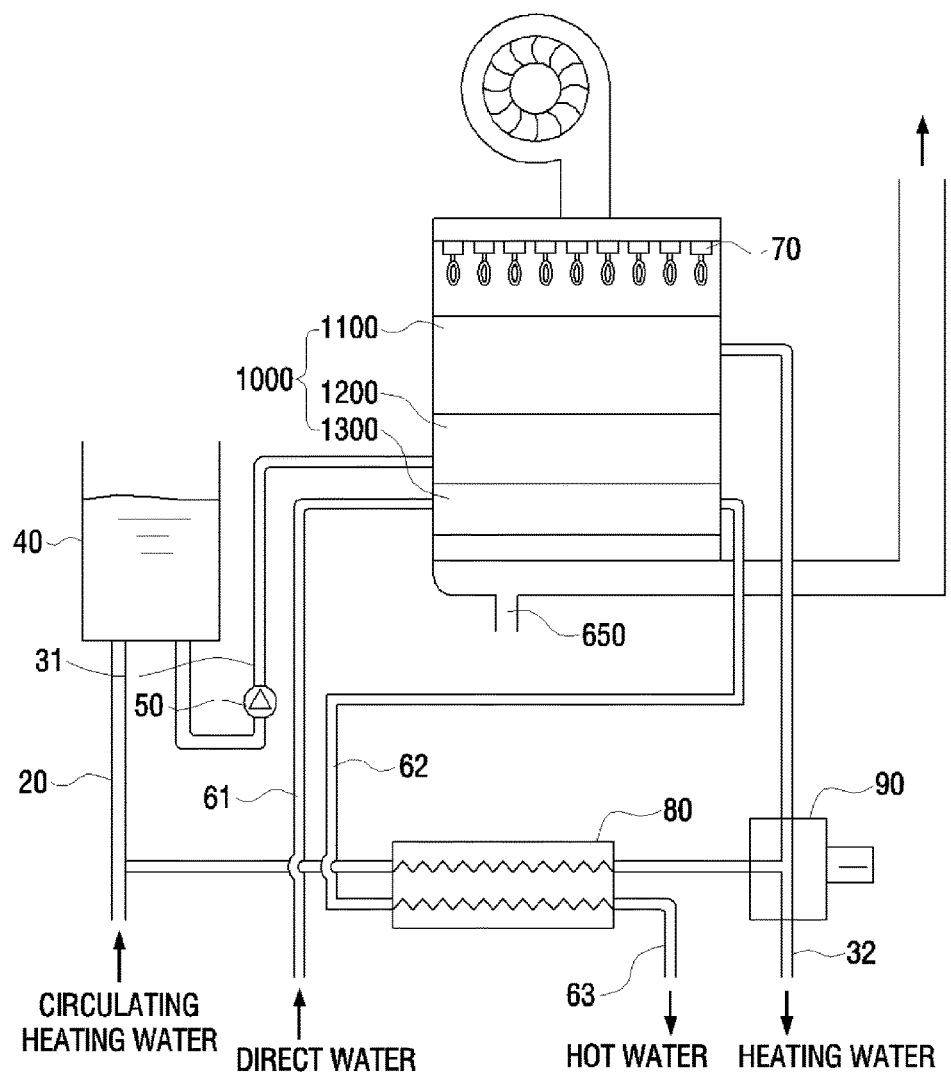
FIG. 2 is a block diagram illustrating a condensing gas boiler provided with a heat exchanger of the present disclosure.
Figure 3:
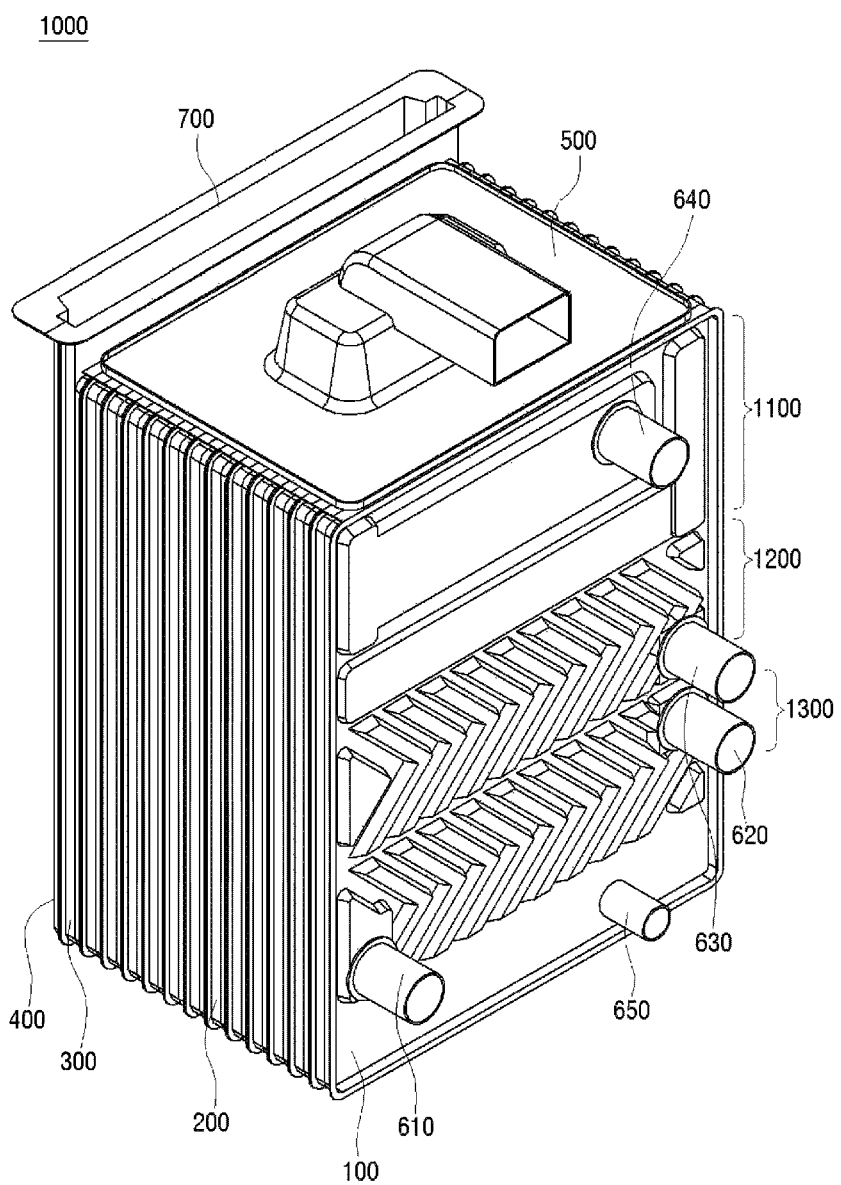
FIG. 3 is a perspective view of the heat exchanger of the present disclosure.
Figure 4:
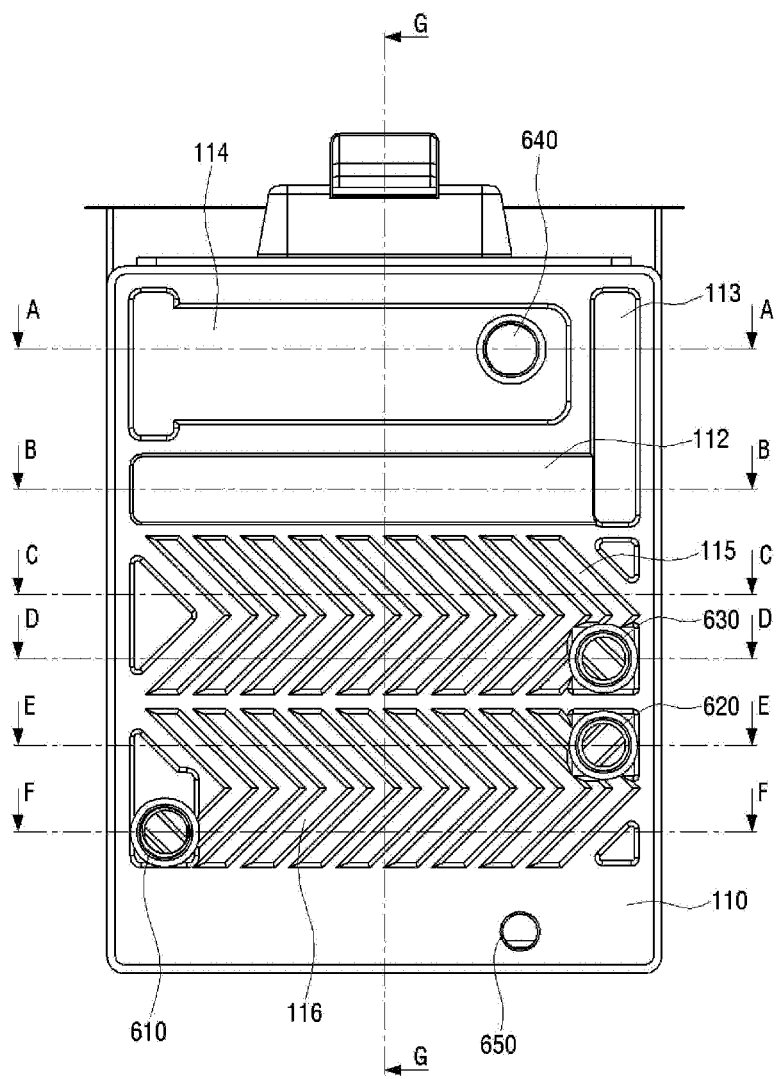
FIG. 4 is a front view of the heat exchanger of FIG. 3.
Figure 5:
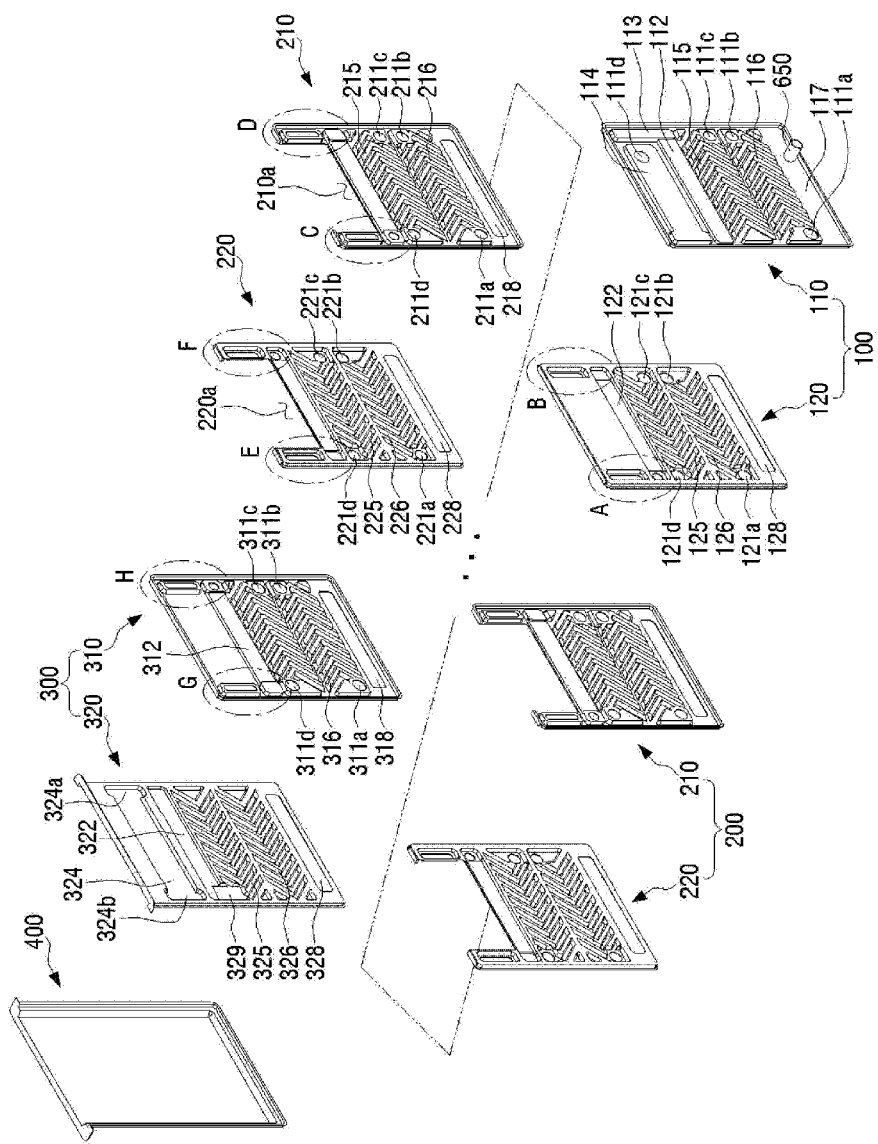
FIG. 5 is an exploded perspective view illustrating each component of the heat exchanger of FIG. 3.

With reference to FIG. 2, a condensing gas boiler provided with a heat exchanger of the present disclosure will be described.

As shown in FIG. 2, a condensing gas boiler provided with a heat exchanger 1000 of the present disclosure includes an expansion tank 40 storing heating water (a first heating medium) flowing therein through a circulating heating water inflow pipe 20, a circulating pump 50 circulating the heating water discharged from the expansion tank 40 through a circulating heating water discharge pipe 31, the heat exchanger 1000 exchanging heat among combustion gas generated at a burner 70, the heating water, and direct water (a second heating medium), and a three way valve 90 supplying the heating water to a heating water supply pipe 32 when performing a heating operation and to a hot water supply heat exchange unit 80 when performing a hot water supply operation.

The heat exchanger 1000 is configured with a heating sensible-heat exchange unit 1100 (a first heat exchange unit) applying heat to the heating water using sensible heat of the combustion gas, a heating latent-heat exchange unit 1200 (a second heat exchange unit) applying heat to the heating water using latent heat of the combustion gas passed the heating sensible-heat exchange unit 1100, and a direct water heat exchange unit 1300 (a third heat exchange unit) applying heat to direct water to produce hot water by means of latent heat of the combustion gas passed the heating latent-heat exchange unit 1200 and then supplying the hot water to the hot water supply heat exchange unit 80.

The hot water being heated in the direct water heat exchange unit 1300 is supplied to the hot water supply heat exchange unit 80 through a hot water discharge pipe 62. In this case, the heating water supplied from the heating sensible-heat exchange unit 1100 and the hot water supplied from the direct water heat exchange unit 1300 exchange heat with each other in the hot water supply heat exchange unit 80, and thus hot water of a user requested temperature is supplied through a hot water supply pipe 63.

The heating water being pressure delivered by the circulating pump 50 is firstly supplied to the heating latent-heat exchange unit 1200 to primarily exchange heat with the combustion gas generated at the burner 70, and the heating water passed the heating latent-heat exchange unit 1200 is supplied to the heating sensible-heat exchange unit 1100 to secondarily exchange heat with the combustion gas, thereby being supplied to a heating required zone through the heating water supply pipe 32.

<Heat Exchanger>

With Reference to FIGS. 3, 5, 7, 9, 11, 13, 15, 17, 19, 20, and 21, a heat exchanger will be described.

A heat exchanger 1000 exchanges heat among combustion gas generated at a burner 70 burning a mixture, a first heating medium (heating water), and a second heating medium (direct water). The heat exchanger 1000 includes first to third heat exchange units 1100, 1200, and 1300 in each of which a heating medium flow channel in which heating water and direct water flows and a combustion gas flow channel in which the combustion gas flows are alternately formed to be adjacent to each other in each space among a plurality of plates 110, 120, 210, 220, 310, and 320, and a combustion gas discharge unit 700 discharging combustion gas that passed the first to third heat exchange units 1100, 1200, and 1300.

The burner 70 is coupled to a lower part of a burner supporting plate 500 that is provided at an upper end of the heat exchanger 1000, and combustion gas generated at the burner 70 flows in a downward direction.

The first heat exchange unit 1100, the second heat exchange unit 1200, and the third heat exchange unit 1300 are sequentially provided from an upper side to a lower side along a flow direction of the combustion gas generated at the burner 70.

A direct water inlet 610, in which direct water flows, is coupled to one lower side of the third heat exchange unit 1300, and a hot water outlet 620 is coupled to an upper diagonal side thereof against the direct water inlet 610, wherein the hot water outlet 620 discharges the direct water, which flows in through the direct water inlet 610 to be heated in a heat transfer flow channel inside the third heat exchange unit 1300, to a hot water supply heat exchange unit 80.

A heating water inlet 630, in which heating water being pressure delivered by a circulating pump 50 flows, is coupled to the second heat exchange unit 1200, and the heating water flowing in through the heating water inlet 630 exchanges heat with combustion gas while passing a heating medium flow channel inside the second heat exchange unit 1200.

A heating water outlet 640 is coupled to the first heat exchange unit 1100, and the heating water being primarily heated at the second heat exchange unit 1200 is secondarily heated by the combustion gas while passing a heating medium flow channel inside the first heat exchange unit 1100 and then is discharged to a three way valve 90 through the heating water outlet 640.

Each of the first heat exchange unit 1100, the second heat exchange unit 1200, and the third heat exchange unit 1300 is defined by a pair of neighboring plates facing each other and an inner space formed between the pair of plates, and each of them exchanges heat between a heating medium flowing through the inner space and combustion gas flowing through an outer space of the pair of plates.

An inner space of the first heat exchange unit 1100 serves as a first heating medium sensible heat flow channel in which heating water as the first heating medium flows, an inner space of the second heat exchange unit 1200 serves as a first heating medium latent heat flow channel in which the heating water flows, and an inner space of the third heat exchange unit 1300 serves as a second heating medium flow channel in which direct water flows.

The first heating medium sensible heat flow channel and first heating medium latent heat flow channel are communicated with each other, and the second heating medium flow channel is separated from the first heating medium sensible heat flow channel and the first heating medium latent heat flow channel.

Each of the first to third heat exchange units 1100, 1200, and 1300 is configured with a structure in which edges of the plurality of plates 110, 120, 210, 220, 310, and 320 are connected to each other.

The plurality of plates 110, 120, 210, 220, 310, and 320 forms a first end plate portion 100 configuring one side of the heat exchanger 1000, a second end plate portion 300 configuring the other side thereof, and a plurality of middle plate portions 200 provided between the first end plate portion 100 and the second end plate portion 300.

The first heating medium sensible heat flow channel, the first heating medium latent heat flow channel, and the second heating medium flow channel are formed inside the inner space of each of the first end plate portion 100, the respective middle plate portions 200, and the second end plate portion 300. The first end plate portion 100 is configured with a first outer side plate 110 and a first inner side plate 120, both of which are connected to each other with their edge circumferences, each of the middle plate portions 200 is configured with a first middle plate 210 and a second middle plate 220, both of which are connected to each other with their edge circumferences, and the second end plate portion 300 is configured with a second inner side plate 310 and a second outer side plate 320, both of which are connected to each other with their edge circumferences.

In the second end plate portion 300, the heating water sequentially passes the first heating medium latent heat flow channel and the first heating medium sensible heat flow channel because the first heating medium sensible heat flow channel and the first heating medium latent heat flow channel are communicated with each other, whereas the direct water passes only the second heating medium flow channel to become hot water, thereby being supplied to the hot water supply heat exchange unit 80 because the second heating medium flow channel is separated from the first heating medium sensible heat flow channel and the first heating medium latent heat flow channel.

Also, in the second end plate portion 300, a flow channel switching is performed to flow the heating water and the direct water delivered from the middle plate portions 200 in a reverse direction theretoward.

Consequently, the direct water and the heating water flowing in the first end plate portion 100 flow inside the second end plate portion 300 after passing the middle plate portions 200, and the direct water and the heating water being switched in the reverse flow direction at the second end plate portion 300 again pass the middle plate portions 200 and then is discharged through the first end plate portion 100.

The first outer side plate 110 includes a direct water inlet hole 111*a* in which direct water flows, a hot water outlet hole 111*b* discharging the direct water to the hot water supply heat exchange unit 80, wherein the direct water flows in through the direct water inlet hole 111*a* and then is heated at the third heat exchange unit 1300, a heating water inlet hole 111*c* in which the heating water being pressure delivered from the circulating pump 50 flows, and a heating water outlet hole 111*d* discharging the heating water to the three way valve 90, wherein the heating water flows in through the heating water inlet hole 111*c* and then is heated while sequentially passing the second heat exchange unit 1200 and the first heat exchange unit 1100.

The first inner side plate 120 includes a direct water passing hole 121*a*, a hot water passing hole 121*b*, and a first heating water passing hole 121*c*, which are formed at positions corresponding to the direct water inlet hole 111*a*, the hot water outlet hole 111*b*, and the heating water inlet hole 111*c*, respectively, and a second heating water passing hole 121*d* formed at an upper diagonal side of the first inner side plate 120 against the first heating water passing hole 121*c*.

The first middle plate 210 and the second middle plate 220 include direct water passing holes 211*a* and 221*a*, hot water passing holes 211*b* and 221*b*, first heating water passing holes 211*c* and 221*c*, and second heating water passing holes 211*d* and 221*d*, pairs of which are formed at positions corresponding to the direct water passing hole 121*a*, the hot water passing hole 121*b*, the first heating water passing hole 121*c*, and the second heating water passing hole 121*d*, respectively.

The second inner side plate 310 includes a direct water passing hole 311*a*, a hot water passing hole 311*b*, a first heating water passing hole 311*c*, and a second heating water passing hole 311*d*, which are formed at positions corresponding to the direct water passing holes 211*a* and 221*a*, the hot water passing holes 211*b* and 221*b*, the first heating water passing holes 211*c* and 221*c*, and the second heating water passing holes 211*d* and 221*d*.

Positions of the second outer side plate 320, which correspond to the direct water passing hole 311*a*, the hot water passing hole 311*b*, the first heating water passing hole 311*c*, and the second heating water passing hole 311*d*, are occluded such that the flow direction of each of the direct water and the heating water is reversely switched.

First irregular portions 115, 125, 215, 225, 315, and 325 of an arrow head shape are repetitively formed at regular intervals on regions, which correspond to the second heat exchange unit 1200, of the first outer side plate 110, the first inner side plate 120, the first middle plate 210, the second middle plate 220, the second inner side plate 310, and the second outer side plate 320.

The first irregular portion 115 of the first outer side plate 110 and the first irregular portion 125 of the first inner side plate 120 protrude opposite to each other to form a space therebetween, and the arrow head shapes of them are crossed against each other.

Consequently, when the first outer side plate 110 and the first inner side plate 120 come into contact with each other and are coupled to each other, plane portions of the first outer side plate 110 and the first inner side plate 120 come into contact with each other along outer circumferences of the first irregular portions 115 and 125, the heating water inlet hole 111*c*, the first heating water passing hole 121*c*, and the second heating water passing hole 121*d* such that an inside between the first outer side plate 110 and the first inner side plate 120 is occluded. And, owing to a symmetric shape between the first irregular portion 115 of the first outer side plate 110 and the first irregular portion 125 of the first inner side plate 120, an inner space between the first irregular portions 115 and 125 becomes a first heating medium latent heat flow channel in which a first heating medium flows.

In this case, among inner spaces between the first outer side plate 110 and the first inner side plate 120, inner spaces at which the heating water inlet hole 111c, the first heating water passing hole 121c, the second heating water passing hole 121d, and the first irregular portions 115 and 125 are located are connected to each other so that the heating water flowing in through the heating water inlet hole 111c passes the entire inner spaces to move to the middle plate portions 200 through the first heating water passing hole 121c and the second heating water passing hole 121d.

The first irregular portion 215 of the first middle plate 210 and the first irregular portion 315 of the second inner side plate 310 are formed in the same shape and direction as those of the first irregular portion 115 of the first outer side plate 110, and the first irregular portion 225 of the second middle plate 220 and the first irregular portion 325 of the second outer side plate 320 are formed in the same shape and direction as those of the first irregular portion 125 of the first inner side plate 120.

Therefore, when the first middle plate 210 and the second middle plate 220 come into bonding contact with each, inner spaces at which the first irregular portions 215 and 225, the first heating water passing holes 211c and 221c, and the second heating water passing holes 211d and 221d are located become a single connected space to configure the first heating medium latent heat flow channel.

Also, when the second inner side plate 310 and the second outer side plate 320 come into bonding contact with each other, inner spaces at which the first irregular portions 315 and 325, the first heating water passing hole 311c, and the second heating water passing hole 311d are located become a single connected space to configure the first heating medium latent heat flow channel.

Meanwhile, second irregular portions 116, 126, 216, 226, 316, and 326 are formed at regions of the third heat exchange unit 1300 below the first irregular portions 115, 125, 215, 225, 315, and 325 of the plates 110, 120, 210, 220, 310, and 320.

The second irregular portion 116 of the first outer side plate 110 is formed in the same shape and direction as those of the first irregular portion 115, and the first irregular portions 125, 215, 225, 315, and 325 and the second irregular portions 126, 216, 226, 316, and 326 are formed in the same shape and direction as each other at the remaining plates 120, 210, 220, 310, and 320.

Consequently, inner spaces at which the second irregular portions 116 and 126, the direct water inlet hole 111a, the hot water outlet hole 111b, the direct water passing hole 121a, and the hot water passing hole 121b are located as a space between the first outer side plate 110 and the first inner side plate 120, inner spaces at which the second irregular portions 216 and 226, the direct water passing holes 211a and 221a, and the hot water passing holes 211b and 221b are located as a space between the first middle plate 210 and the second middle plate 220, and inner spaces at which the second irregular portions 316 and 326, the direct water passing hole 311a, and the hot water passing hole 311b are located as a space between the second inner side plate 310 and the second outer side plate 320 become a single connected space, and these inner spaces are entirely communicated with each other through the direct water passing holes 121a, 211a, 221a, and 311a and the hot water passing holes 121b, 211b, 221b, and 311b, thereby forming the second heating medium flow channel.

With such a configuration, the first irregular portions formed at plates facing each other among all the plates 110, 120, 210, 220, 310, and 320 are symmetrically provided to cross against each other in an irregular direction, and the second irregular portions formed at plates facing each other thereamong are symmetrically provided to cross against each other in an irregular direction.

As a result, the first heating medium latent heat flow channels and the second heating medium flow channels between the plates are provided in a zigzag shape by means of the first and second irregular portions such that a turbulent flow is formed while the heating water and the direct water pass these flow channels, and thus heat exchange efficiency with the combustion gas may be improved.

In addition, a space between the first inner side plate 120 and the first middle plate 210, a space between the middle plate portions 200 being adjacent to each other, and a space between the second inner side plate 310 and the second middle plate 220 of a last plate of the middle plate portions 200 become the combustion gas flow channel in which the combustion gas flows. The first irregular portions and the second irregular portions formed at the plates facing each other among such plates forming the spaces are symmetrically provided to cross against each other in an irregular direction so that a turbulent flow is formed while the combustion gas passes the combustion gas flow channel, and thus heat exchange efficiency with the heating water and the direct water flowing the heating medium flow channels may be improved.

Meanwhile, as a first heating medium sensible heat flow channel, a lower sensible heat flow channel and an upper sensible heat flow channel being located above the lower sensible heat flow channel are provided in spaces between the plates 110, 120, 210, 220, 310, and 320, wherein the spaces correspond to the first heat exchange unit 1100.

In order to form the lower sensible heat flow channel, lower sensible heat flow channel protruding portions 112, 122, 212, 222, 312, and 322 of a rectangular shape being long in a horizontal direction are formed at the plates 110, 120, 210, 220, 310, and 320, respectively.

The lower sensible heat flow channel protruding portions 112 and 122, which are formed at the first outer side plate 110 and the first inner side plate 120, respectively, protrude opposite to each other so that an inner space surrounded by a pair of the lower sensible heat flow channel protruding portions 112 and 122 facing each other forms the lower sensible heat flow channel.

Figure 21:
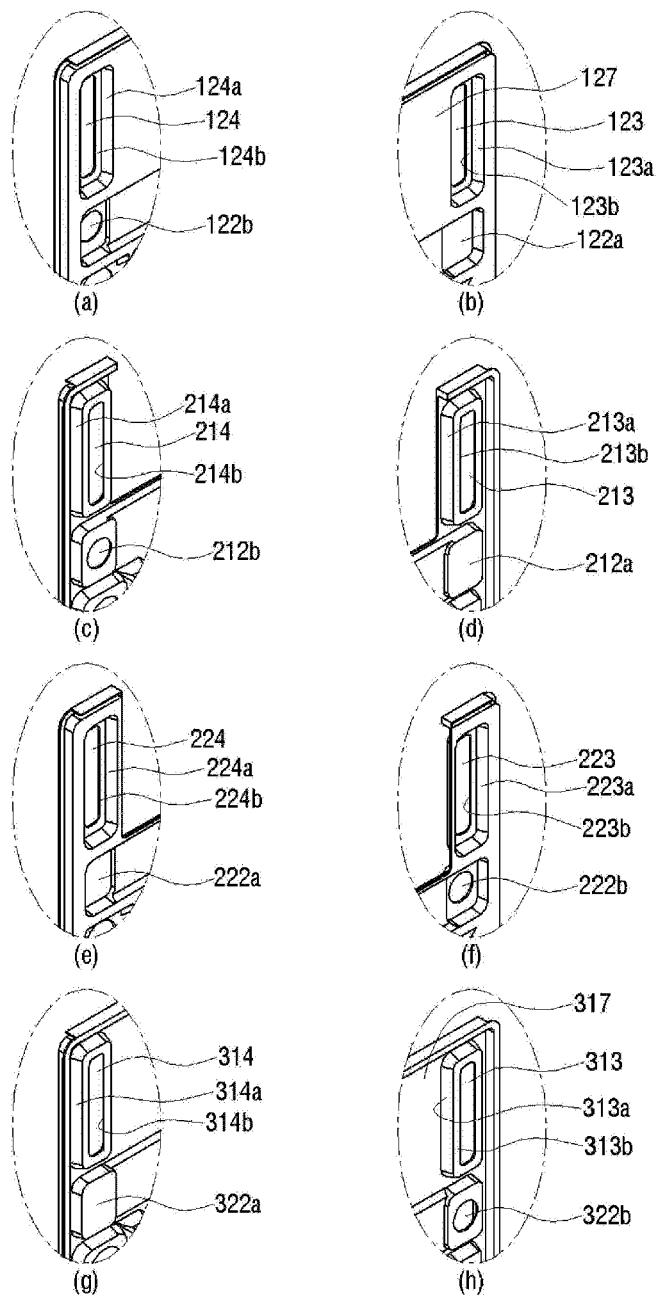
FIG. 21 is enlarged views of portions A, B, C, D, E, F, G, and H of FIG. 5.

At both ends of each of the lower sensible heat flow channel protruding portions 122, 212, 222, and 312 which are formed at the first inner side plate 120, the first middle plate 210, the second middle plate 220, and the second inner side plate 310, respectively, occluded portions 122a, 212a, 222a, and 312a of an occluded shape shown in FIG. 21 and through holes 122b, 212b, 222b, and 312b of a circular shape shown in FIG. 21 are formed.

The lower sensible heat flow channel protruding portion 112 of the first outer side plate 110 is formed in a shape being completely occluded along a left and right length direction, and also the both ends of the lower sensible heat flow channel protruding portion 322 of the second outer side plate 320 are formed in an occluded shape.

The occluded portion and the through hole are formed at the same positions of the pair of the plates 210 and 220 facing each other of the plurality of middle plate portions 200, respectively, so as to form the combustion gas flow channel inside the pair of the plates 210 and 220. And, the occluded portion and the through hole are formed at a pair of the remaining plates facing each other of the plurality of middle plate portions 200 in an opposite direction, respectively, so as to form the first heating medium sensible heat flow channel inside the pair of the remaining plates.

In other words, the occluded portion 212a and the through hole 212b of the first middle plate 210 configuring one middle plate portion 200 are formed at positions corresponding to the occluded portion 222a and the through hole 222b of the second middle plate 220 configuring another middle plate portion 200 adjacent to the one middle plate portion 200, respectively. As a result, surfaces of the occluded portion 222a and the occluded portion 212a come into contact with each other, and the through hole 222b and the through hole 212b are connected to each other.

Also, the through hole 222b and the occluded portion 222a of the second middle plate 220 configuring a single middle plate portion 200 are formed at positions corresponding to the occluded portion 212a and the through hole 212b of the first middle plate 210 configuring the same single middle plate portion 200, respectively, thereby providing a structure in which the occluded portion and the through hole are formed in an opposite direction.

In addition, the occluded portion 122a and the through hole 122b of the first inner side plate 120 are formed at positions corresponding to the occluded portion 212a and the through hole 212b of the first middle plate 210 adjacent to the first inner side plate 120, respectively, and thus surfaces of the occluded portion 122a and the occluded portion 212a come into contact with each other, and the through hole 122b and the through hole 212b are connected to each other.

Further, the occluded portion 312a and the through hole 312b of the second inner side plate 310 are formed at positions corresponding to the occluded portion 222a and the through hole 222b of the second middle plate 220 adjacent to the second inner side plate 310, respectively, and thus surfaces of the occluded portion 312a and the occluded portion 222a come into contact with each other, and the through hole 312b and the through hole 222b are connected to each other.

Consequently, a space between the lower sensible heat flow channel protruding portion 112 of the first outer side plate 110 and the lower sensible heat flow channel protruding portion 122 of the first inner side plate 120, a space between the lower sensible heat flow channel protruding portion 212 of the first middle plate 210 and the lower sensible heat flow channel protruding portion 222 of the second middle plate 220 which configure a single one of the plurality of the middle plate portions 200, and a space between the lower sensible heat flow channel protruding portion 312 of the second inner side plate 310 and the lower sensible heat flow channel protruding portion 322 of the second outer side plate 320 are entirely communicated with each other, thereby configuring a lower sensible heat flow channel of the first heating medium sensible heat flow channel. In this case, in order to form the first heating medium sensible heat flow channel, the occluded portion and the through hole of a pair of the plates facing each other are arranged to be opposite to each other, and thus the lower sensible heat flow channel has a zigzag shape.

Figure 20:
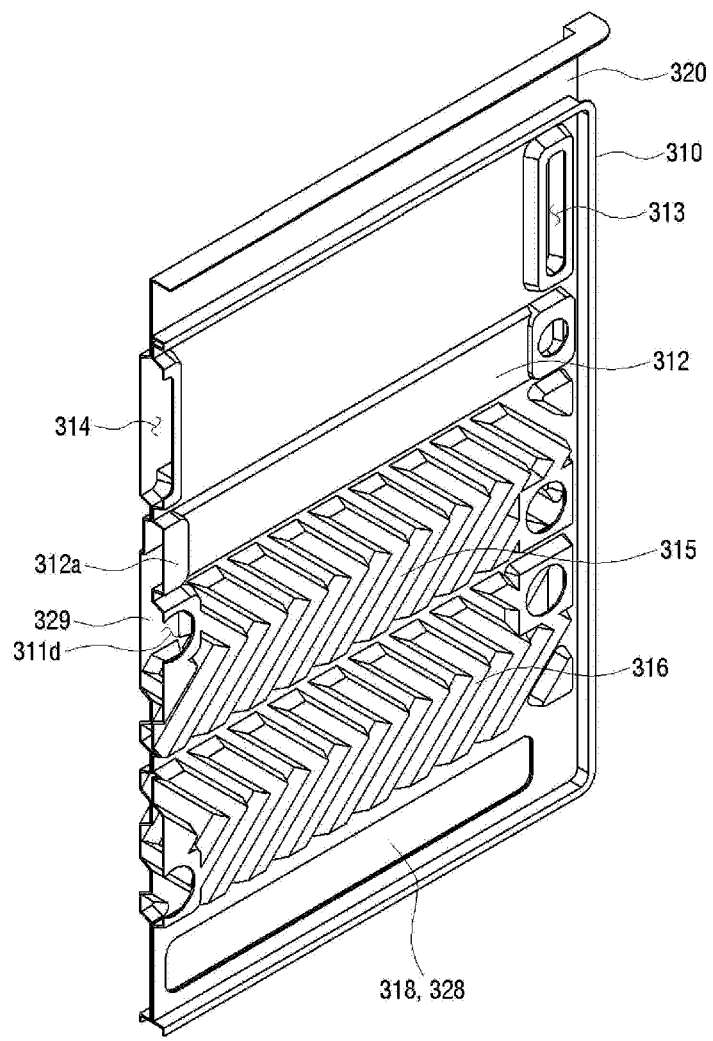
FIG. 20 is a dissected perspective view of a connecting flow channel portion of a second outer plate.

Meanwhile, the first heating medium latent heat flow channel and the lower sensible heat flow channel are connected to each other by means of a flow channel connecting portion 329 shown in FIG. 20. That is, the flow channel connecting portion 329 protruding in a backward direction of the heat exchanger is longitudinally formed at a position of the second outer side plate 320, which corresponds to the second heating water passing hole 311d of the second inner side plate 310, with a predetermined length, and an upper end of the flow channel connecting portion 329 is connected to the lower sensible heat flow channel protruding portion 322.

Therefore, the heating water, which sequentially passed the heating water inlet hole 111c and the first heating medium latent heat flow channel, flows in a space between the lower sensible heat flow channel protruding portion 312 of the second inner side plate 310 and the lower sensible heat flow channel protruding portion 322 of the second outer side plate 320 via the flow channel connecting portion 329, and then a flow direction of the heating water is reversely switched by means of the lower sensible heat flow channel protruding portion 322 so that the heating water flows along the lower sensible heat flow channel of the zigzag shape.

Meanwhile, a sensible heat flow channel connecting portion 113 is formed at an end of one side of the lower sensible heat flow channel protruding portion 112 of the first outer side plate 110, wherein the sensible heat flow channel connecting portion 113 has a rectangular shape extending in an upward direction and protrudes in a forward direction of the heat exchanger.

A first upper sensible heat flow channel protruding portion 114 is formed at a lateral side of an upper part of the sensible heat flow channel connecting portion 113, wherein the first upper sensible heat flow channel protruding portion 114 protrudes in the forward direction of the heat exchanger and has an approximate rectangular shape at which the heating water outlet hole 111d is formed.

A first through hole protruding portion 123a and a first upper flow channel through hole 123 are formed at an end of one side of the first inner side plate 120, wherein the first through hole protruding portion 123a protrudes in the backward direction of the heat exchanger and the first upper flow channel through hole 123 has a longitudinal slot shape passing through the first through hole protruding portion 123a. A second through hole protruding portion 124a and a second upper flow channel through hole 124 are formed at an end of the other side of the first inner side plate 120, wherein the second through hole protruding portion 124a and the second upper flow channel through hole 124 have the same shapes as those of the first through hole protruding portion 123a and the first upper flow channel through hole 123, respectively. A flat panel 127 of a flat shape is provided between the first and second through hole protruding portions 123a and 124a.

Therefore, when the first outer side plate 110 and the first inner side plate 120 come into bonding contact with each other, spaces are formed between the sensible heat flow channel connecting portion 113 and the first through hole protruding portion 123a, the first upper sensible heat flow channel protruding portion 114 and the flat panel 127, and a lateral end portion 114a of the first upper sensible heat flow channel protruding portion 114 and the second through hole protruding portion 124a, thereby forming the upper sensible heat flow channel.

Also, a first through hole protruding portion 213a, a first upper flow channel through hole 213, a second through hole protruding portion 214a, and a second upper flow channel through hole 214 are formed at one side and the other side of the first middle plate 210 adjacent to the first inner side plate 120, wherein the first through hole protruding portion 213a, the first upper flow channel through hole 213, the second through hole protruding portion 214a, and the second upper flow channel through hole 214 correspond to the first through hole protruding portion 123a, the first upper flow channel through hole 123, the second through hole protruding portion 124a, and the second upper flow channel through hole 124 of the first inner side plate 120, respectively.

In this case, the first and second through hole protruding portions 213a and 214a of the first middle plate 210 protrude in the forward direction of the heat exchanger, and thus they protrude in an opposite direction against the first and second through hole protruding portions 123a and 124a of the first inner side plate 120. Therefore, when the first inner side plate 120 and the first middle plate 210 come into bonding contact with each other, upper flange portions 213b and 214b of the first and second through hole protruding portions 213a and 214a of the first middle plate 210 come into contact with upper flange portions 123b and 124b of the first and second through hole protruding portions 123a and 124a of the first inner side plate 120, respectively. As a result, the first upper flow channel through holes 123 and 213 are connected to each other and the second upper flow channel through holes 124 and 214 are connected to each other, thereby configuring the upper sensible heat flow channel.

Also, first and second through hole protruding portions 223a and 224a and first and second upper flow channel through holes 223 and 224, which have the same shapes and protrude in the same directions as those of the first and second through hole protruding portions 123a and 124a and the first and second upper flow channel through holes 123 and 124 being formed at the first inner side plate 120, are formed at the second middle plate 220 facing the first middle plate 210.

Therefore, when the first middle plate 210 and the second middle plate 220 come into bonding contact with each other, spaces are formed between the first and second through hole protruding portions 213a and 214a of the first middle plate 210 and the first and second through hole protruding portions 223a and 224a of the second middle plate 220, thereby configuring the upper sensible heat flow channel.

In this case, space portions 210a and 220a are formed between the first and second through hole protruding portions 213a and 214a of the first middle plate 210, and the first and second through hole protruding portions 223a and 224a of the second middle plate 220, respectively, thereby providing a combustion space 71 (FIG. 19) for combustion in the burner 70.

Also, first and second through hole protruding portions 313a and 314a and first and second upper flow channel through holes 313 and 314 are formed at the second inner side plate 310 facing the second middle plate 220 provided at a last position of the middle plate portions 200, thereby corresponding to the first and second through hole protruding portions 223a and 224a and the first and second upper flow channel through holes 223 and 224 of the second middle plate 220, respectively. In addition, a second upper sensible heat flow channel protruding portion 324 is formed at the second outer side plate 320 facing the second inner side plate 310, wherein the second upper sensible heat flow channel protruding portion 324 protrudes in the backward direction of the heat exchanger with a horizontal rectangular shape, and both ends 324a and 324b of the second upper sensible heat flow channel protruding portion 324 correspond to the first and second through hole protruding portions 313a and 314a.

Consequently, an upper part of the sensible heat flow channel connecting portion 113, the first upper flow channel through holes 123, 213, 223, and 313, the second upper sensible heat flow channel protruding portion 324, the second upper flow channel through holes 314, 224, 214, and 124, and the first upper sensible heat flow channel protruding portion 114 are sequentially connected, thereby configuring the upper sensible heat flow channel.

Meanwhile, an exhaust plate 400 is provided in rear of the second outer side plate 320 and spaced apart therefrom, and the combustion gas discharge unit 700 is configured with a space between the exhaust plate 400 and the second outer side plate 320.

Also, combustion gas communicating holes 128, 218, 228, 318, and 328 are formed below the first inner side plate 120, the first middle plate 210, the second middle plate 220, the second inner side plate 310, and the second outer side plate 320, wherein the combustion gas, which passed through the first to third heat exchange units 1100, 1200, and 1300 in a downward direction, passes the combustion gas communicating holes 128, 218, 228, 318, and 328 in a horizontal direction.

Consequently, a flow direction of the combustion gas passed the combustion gas flow channel is switched in an upward direction at the combustion gas communicating holes 128, 218, 228, 318, and 328, and then the combustion gas is discharged to an outside through the space between the second outer side plate 320 and the exhaust plate 400.

In addition, a condensed water outlet 650 communicating with the combustion gas communicating holes 128, 218, 228, 318, and 328 is provided at the first outer side plate 110, and thus condensed water generated by condensation of the combustion gas is discharged to the outside through the condensed water outlet 650.

As described above, the present disclosure forms the upper sensible heat flow channel, the lower sensible heat flow channel, the first heating medium latent heat flow channel, and the second heating medium flow channel in an inner space of a pair of plates facing each other. Also, irregular portions and protruding portions for configuring the flow channels are integrally formed at each of plates, and these plates are bonded to each other so that the heat exchanger may be integrally manufactured through a simplified manufacturing process.

<First Heating Medium Latent Heat Flow Channel>

With reference to FIGS. 10 to 13, a first heating medium latent heat flow channel of the present disclosure will be described.

Figure 12:
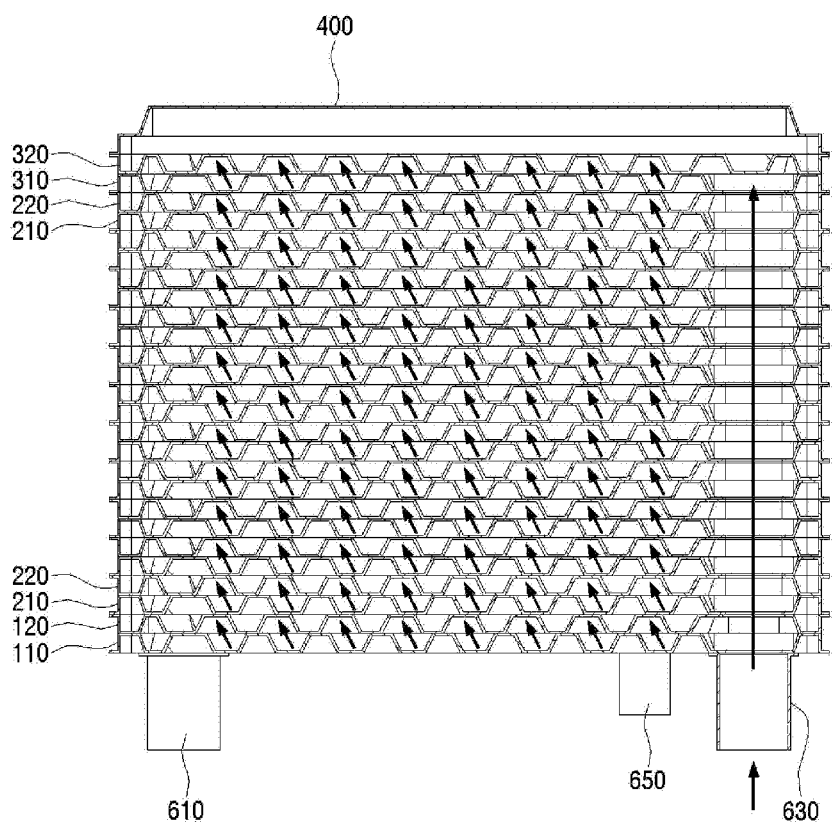
FIG. 12 is a cross-sectional view taken along line D-D of FIG. 4.
Figure 13:
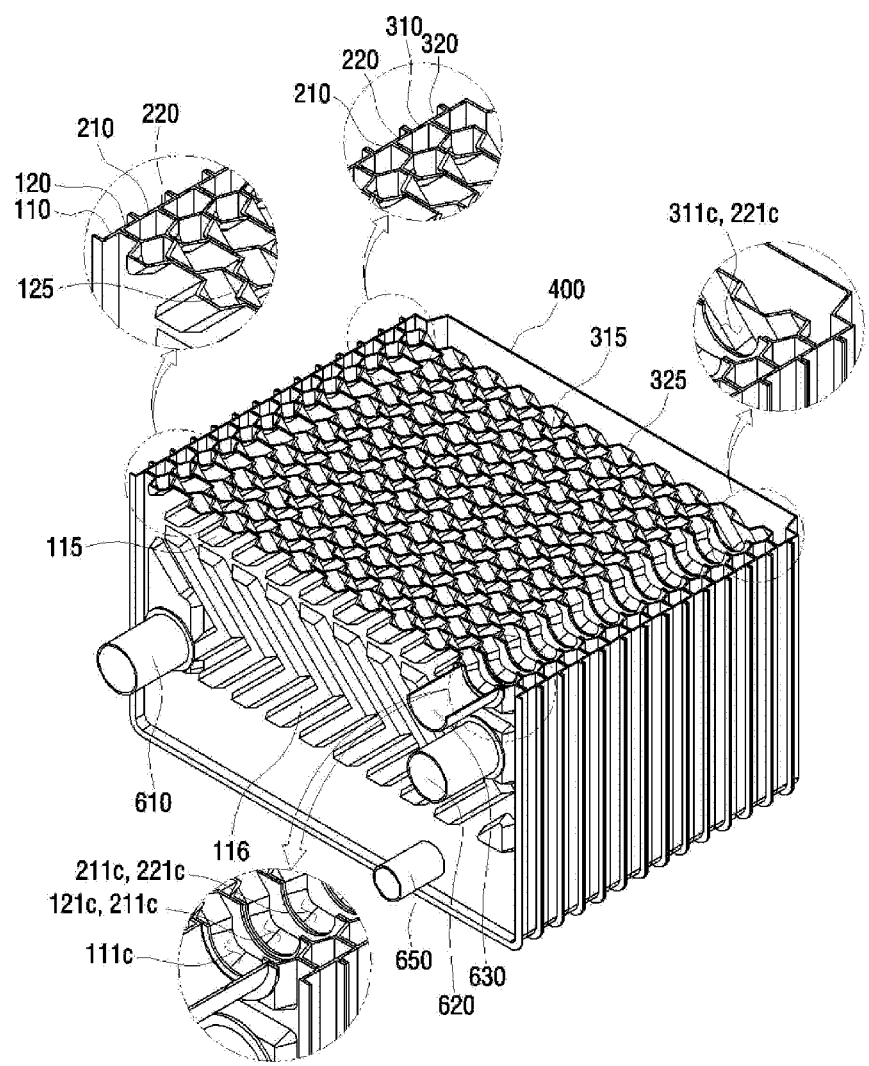
FIG. 13 is a perspective view of a cross section taken along line D-D of FIG. 4.
Figure 14:
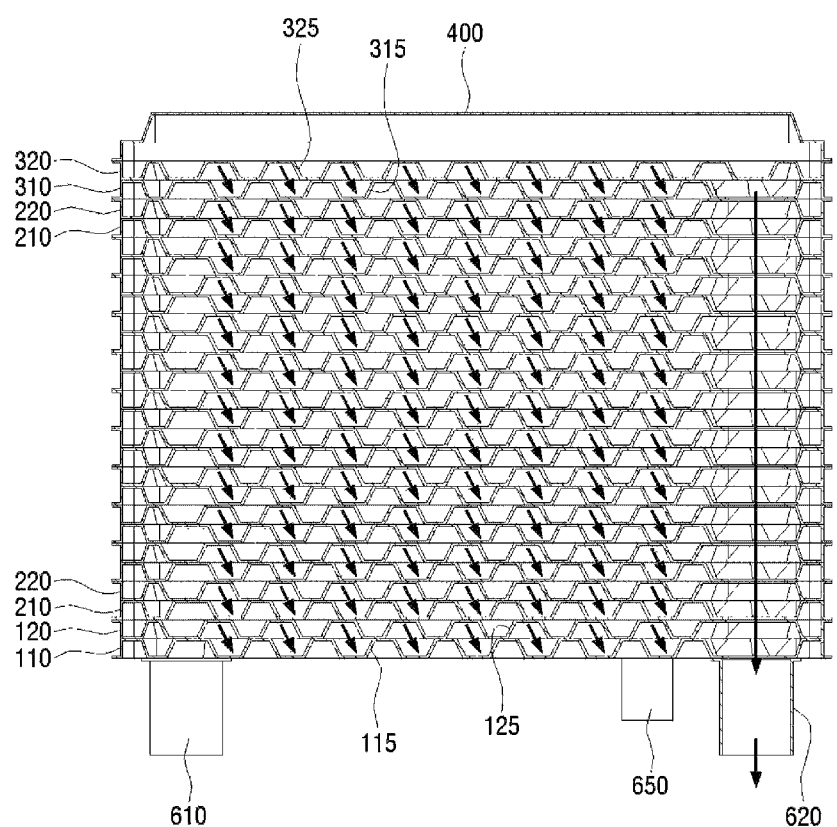
FIG. 14 is a cross-sectional view taken along line E-E of FIG. 4.
Figure 15:
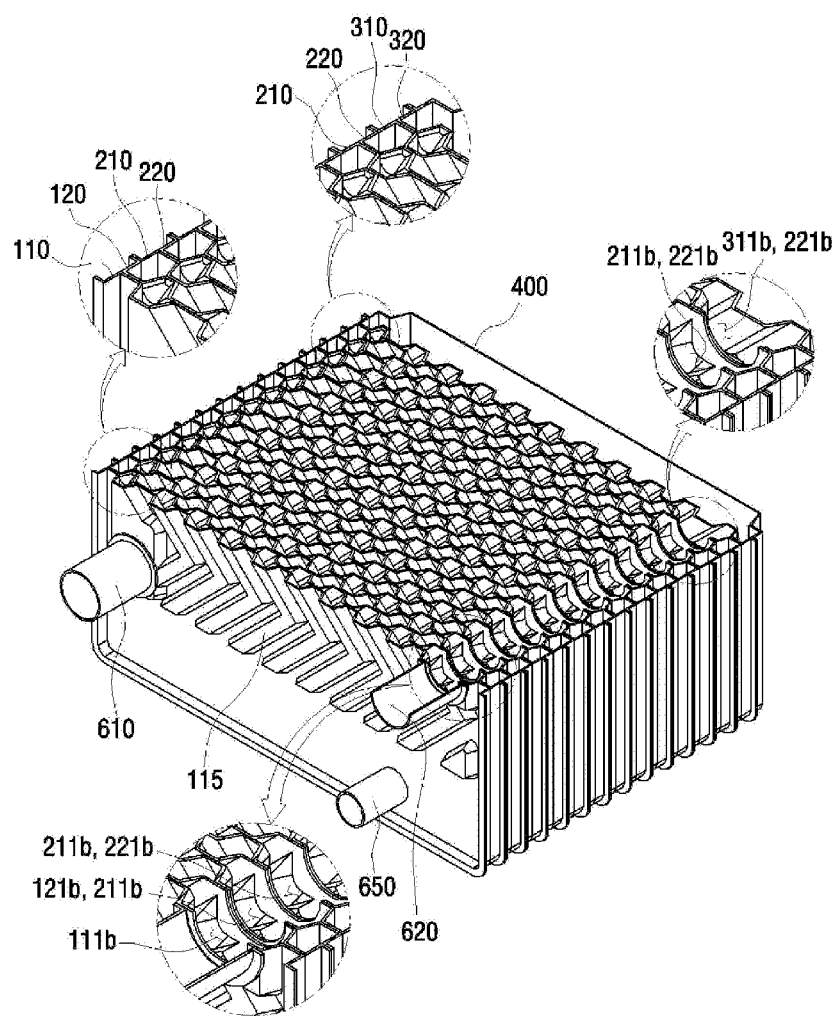
FIG. 15 is a perspective view of a cross section taken along line E-E of FIG. 4.

As shown in FIGS. 12 and 13, heating water flowing in through the heating water inlet 630 sequentially passes the heating water inlet hole 111c, and first heating water passing holes 121c, 211c, 221c, and 311c. Simultaneously, the heating water passes in parallel a space between the first irregular portion 115 of the first outer side plate 110 and the first irregular portion 125 of the first inner side plate 120, a space between the first irregular portion 215 of the first middle plate 210 and the first irregular portion 225 of the second middle plate 220, and a space between the first irregular portion 315 of the second inner side plate 310 and the first irregular portion 325 of the second outer side plate 320.

Figure 10:
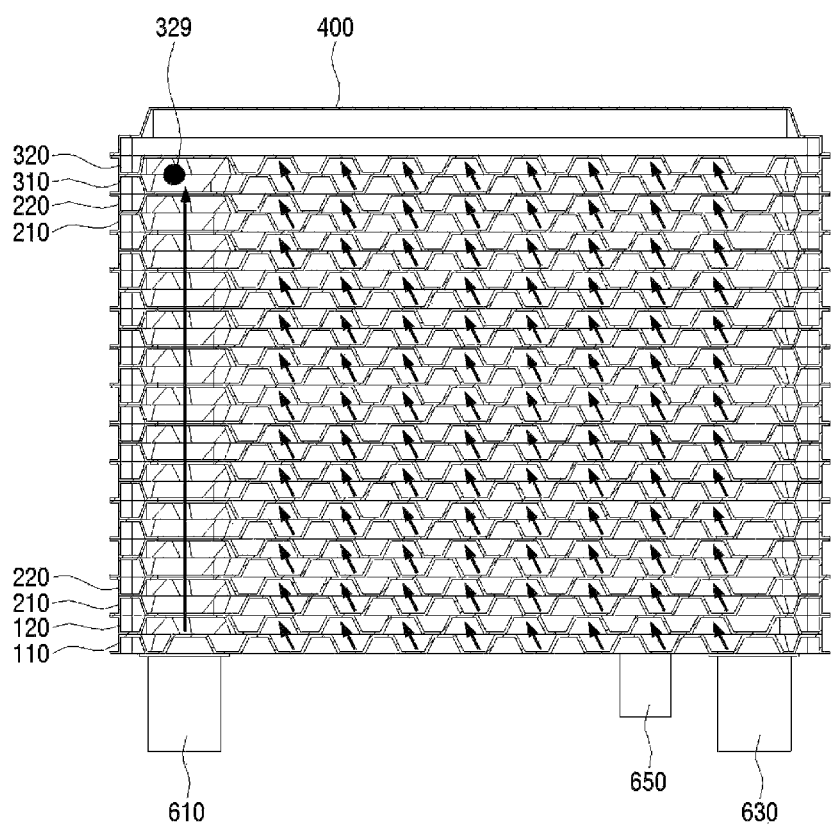
FIG. 10 is a cross-sectional view taken along line C-C of FIG. 4.
Figure 11:
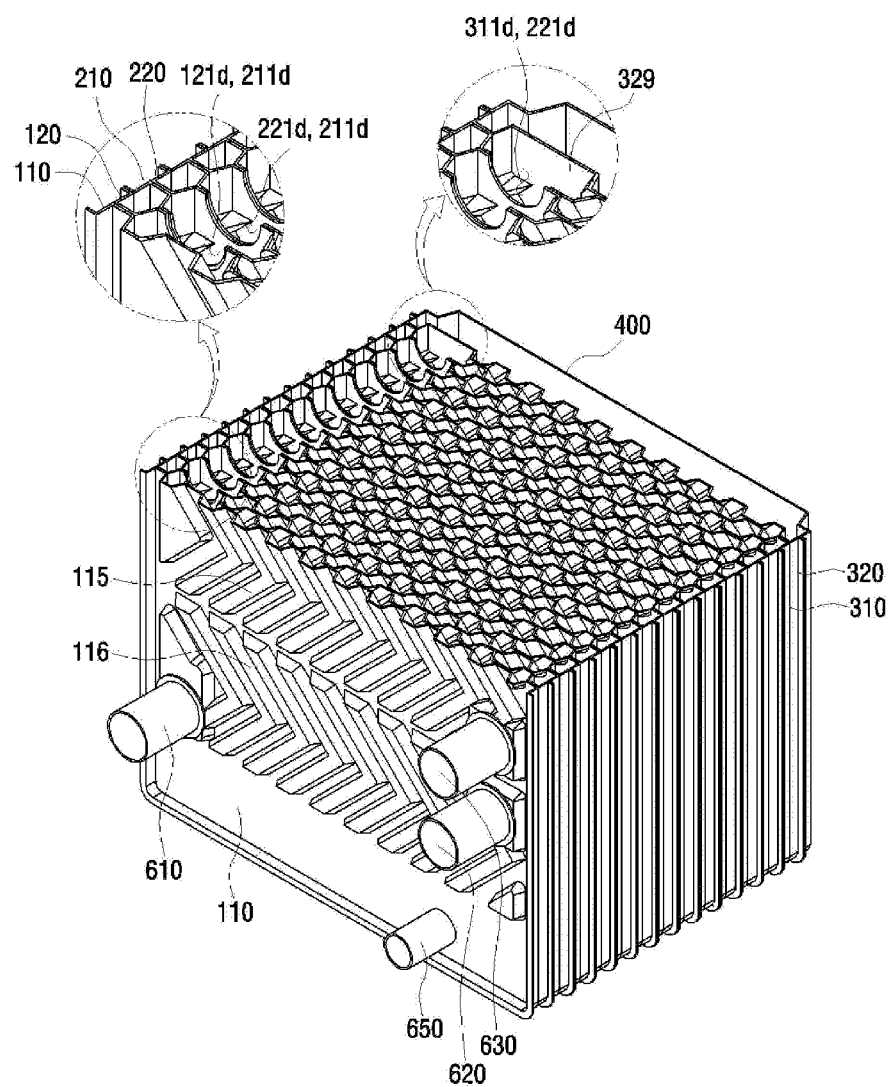
FIG. 11 is a perspective view of a cross section taken along line C-C of FIG. 4.

In addition, as shown in FIGS. 10 and 11, the heating water, which passed the spaces between the irregular portions, sequentially passes the second heating water passing holes 121d, 211d, 221d, and 311d and flows upward through the flow channel connecting portion 329 to move to the first heating medium sensible heat flow channel.

As described above, the heating water absorbs latent heat of the combustion gas while passing the first heating medium latent heat flow channel to be primarily heated, and then flows in the first heating medium sensible heat flow channel.

<First Heating Medium Sensible Heat Flow Channel>

With reference to FIGS. 6 to 9, a first heating medium sensible heat flow channel of the present disclosure will be described.

Figure 8:
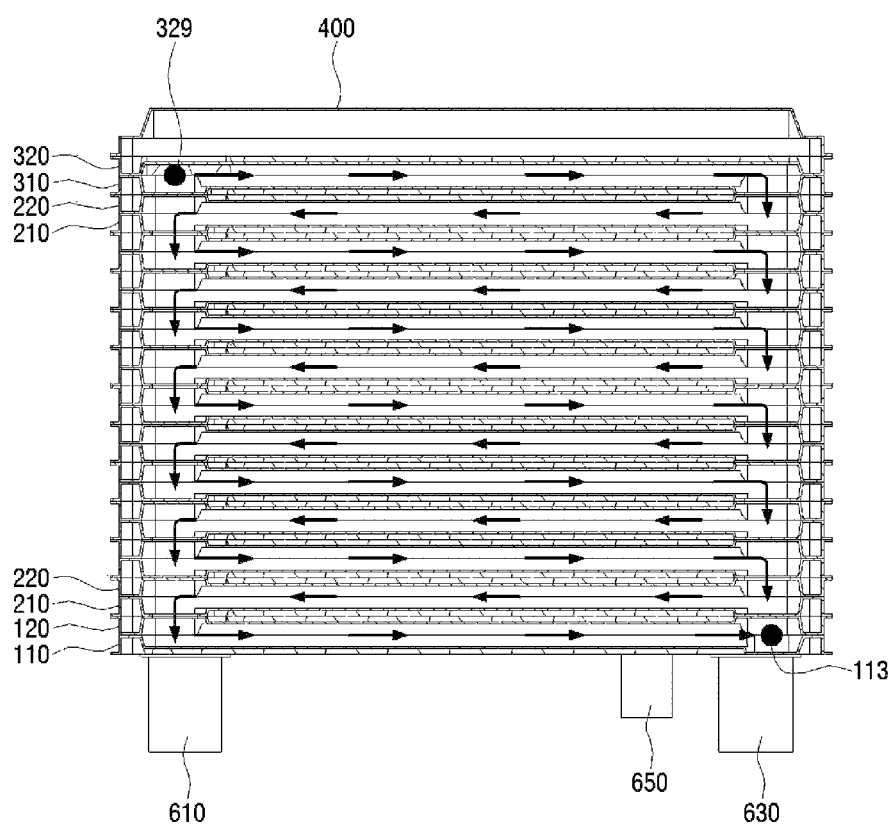
FIG. 8 is a cross-sectional view taken along line B-B of FIG. 4.
Figure 9:
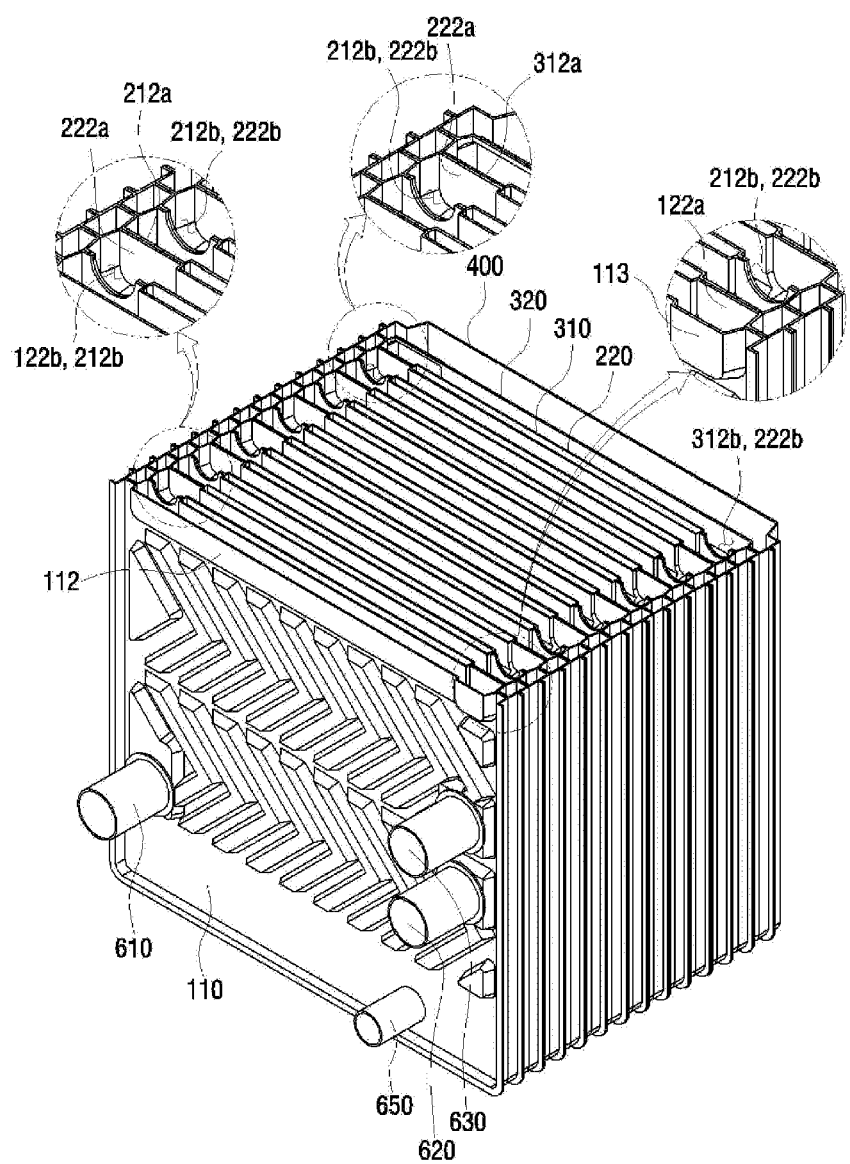
FIG. 9 is a perspective view of a cross-section taken along line B-B of FIG. 4.

As shown in FIGS. 8 and 9, the heating water, which passed the first heating medium latent heat flow channel, flows upward through the flow channel connecting portion 329 and flows in a space between the lower sensible heat flow channel protruding portions 312 and 322 of the second inner side plate 310 and the second outer side plate 320, and then flows in a right direction of FIG. 8 along a length direction of the space.

The heating water flowing horizontally passes through holes 312b and 222b of the second inner side plate 310 and the second middle plate 220, and a flow direction of the heating water is switched by 90 degrees, and then the heating water flows in a left direction of FIG. 8 through a space between the lower sensible heat flow channel protruding portion 222 of the second middle plate 220 and the lower sensible heat flow channel protruding portion 212 of the first middle plate 210.

With such a method, the heating water, which sequentially passed the space between the first middle plate 210 and the second middle plate 220 in a zigzag shape, flows in a space between the lower sensible heat flow channel protruding portion 112 of the first outer side plate 110 and the lower sensible heat flow channel protruding portion 122 of the first inner side plate 120, and then flows in the right direction of FIG. 8 to move up to a position of the sensible heat flow channel connecting portion 113.

Such a flow channel of the heating water corresponds to the lower sensible heat flow channel of the first heating medium sensible heat flow channel.

Figure 6:
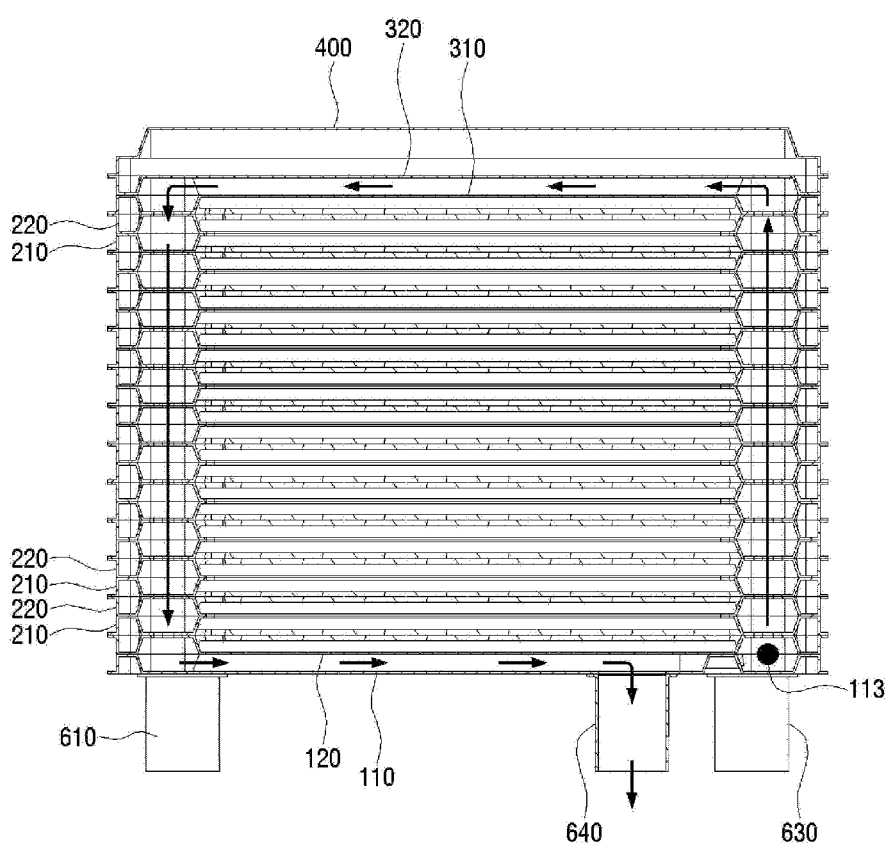
FIG. 6 is a cross-sectional view taken along line A-A of FIG. 4.
Figure 7:
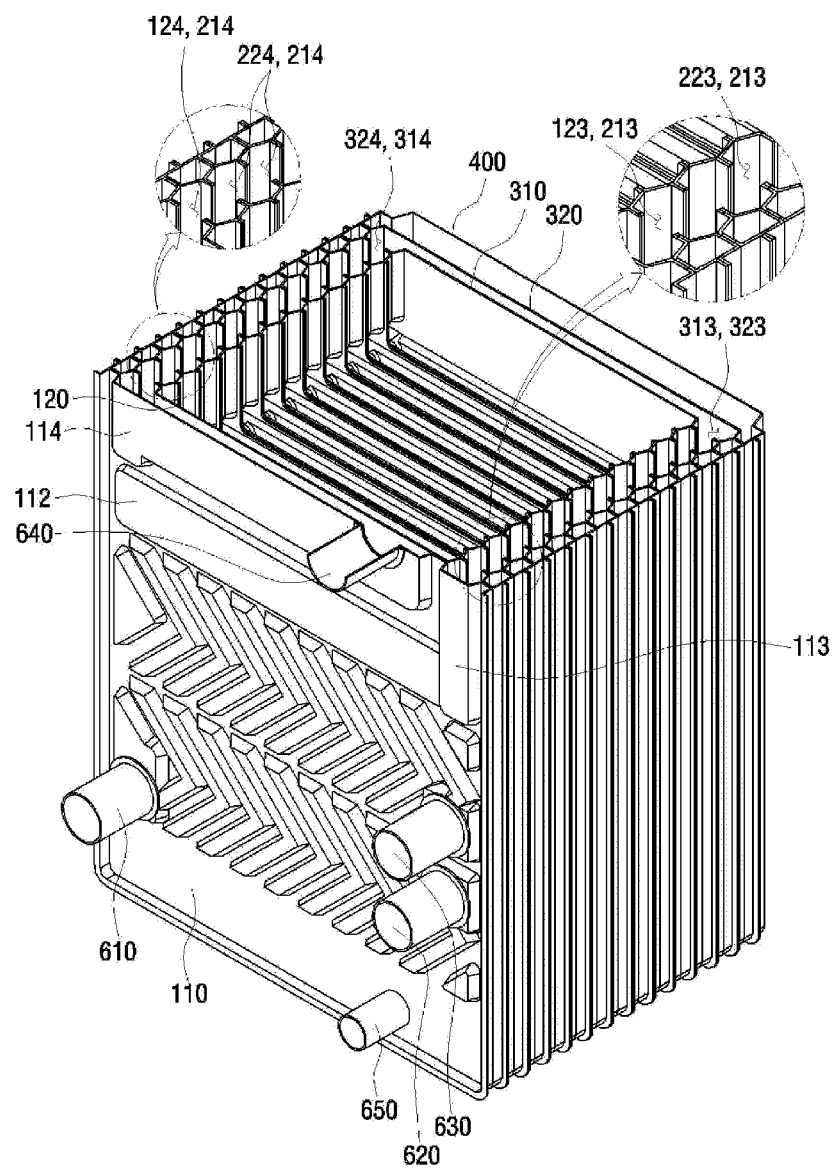
FIG. 7 is a perspective view of a cross section taken along line A-A of FIG. 4.

The heating water, which passed the lower sensible heat flow channel, flows to the upper sensible heat flow channel shown in FIGS. 6 and 7 through the sensible heat flow channel connecting portion 113.

As shown in FIGS. 6 and 7, the heating water moving to an upper side through the sensible heat flow channel connecting portion 113 sequentially passes the first upper flow channel through holes 123, 213, 223, 313, and 323, and then flows in a space between a flat panel 317 of the second inner side plate 310 and the second upper sensible heat flow channel protruding portion 324 of the second outer side plate 320 to move in a left direction of FIG. 6.

A flow channel of the heating water moving up to the end 324b of one side of the second upper sensible heat flow channel protruding portion 324 is switched by 90 degrees, and the heating water sequentially passes the second upper flow channel through holes 314, 224, 214, and 124, and then flows in a space between the first upper sensible heat flow channel protruding portion 114 of the first outer side plate 110 and the flat panel 127 of the first inner side plate 120. A flow direction of the heating water flowing in as described above is switched by 90 degrees and then flows in the right direction of FIG. 6, thereby being discharged through the heating water outlet 640.

As described above, the heating water is undergone heat exchange with the combustion gas while sequentially passing the first heating medium latent heat flow channel, the lower sensible heat flow channel, and the upper sensible heat flow channel, and thus heat exchange time between the combustion gas and the heating water is to be long so that thermal efficiency is improved.

Also, the upper sensible heat flow channel is configured with a structure surrounding the combustion space 71 so that a separate configuration for surrounding an outer wall of the combustion space 71 is not needed, and the heating water of the upper sensible heat flow channel absorbs heat radiated from the combustion space 71 to an outward direction so that thermal efficiency is improved.

<Second Heating Medium Flow Channel>

With reference to FIGS. 14 to 17, a second heating medium flow channel of the present disclosure will be described.

Figure 16:
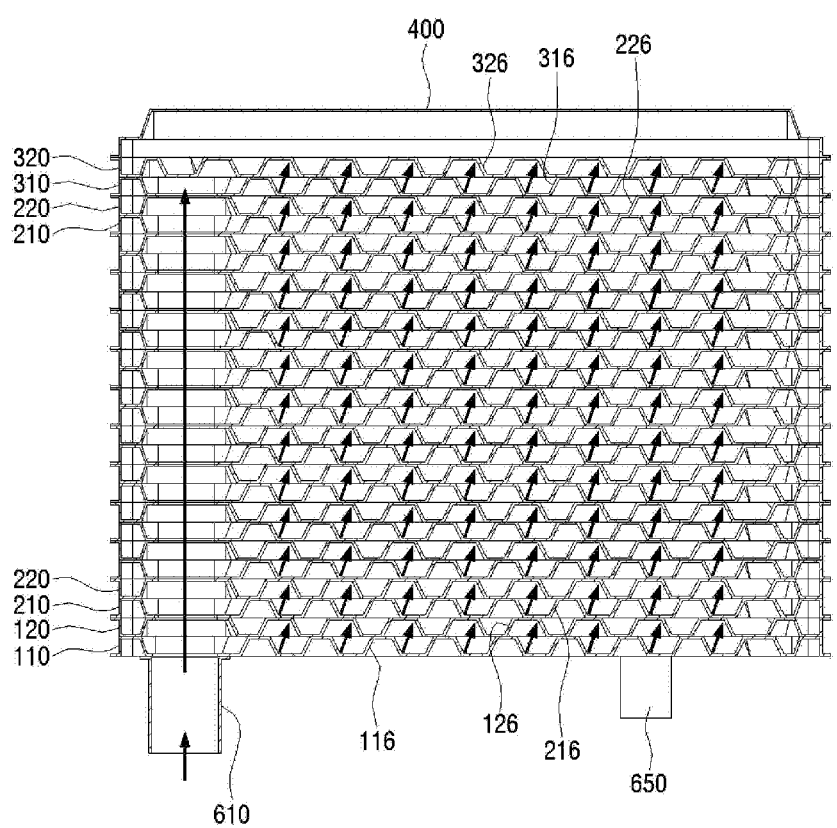
FIG. 16 is a cross-sectional view taken along line F-F of FIG. 4.
Figure 17:
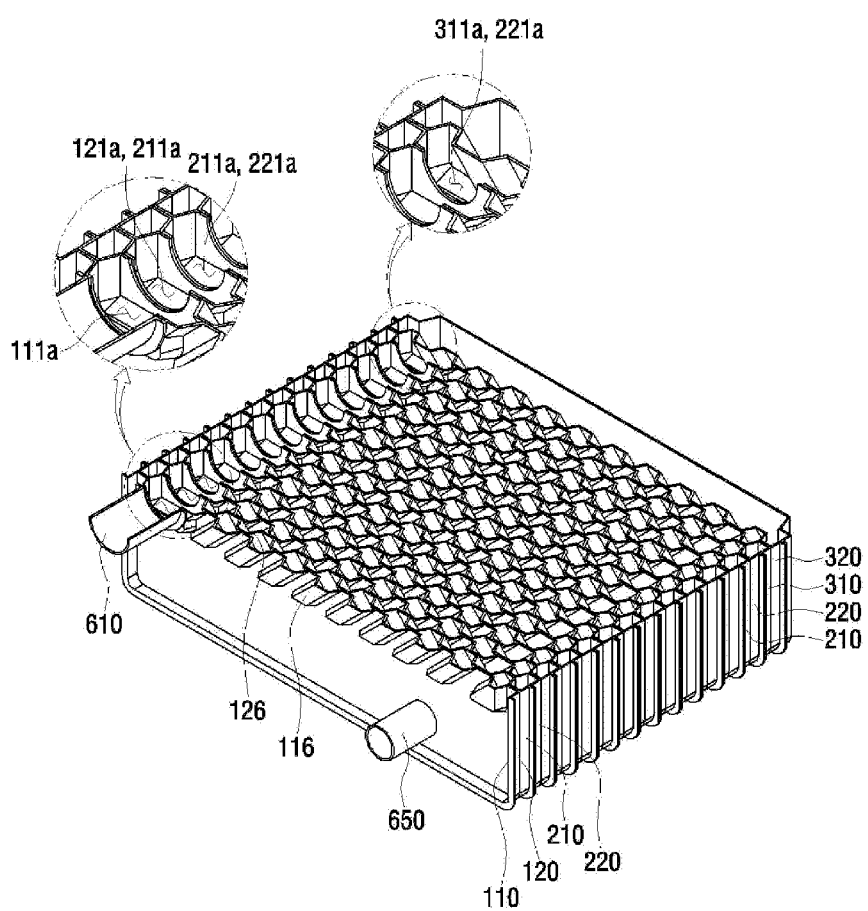
FIG. 17 is a perspective view of a cross section taken along line F-F of FIG. 4.

As shown in FIGS. 16 and 17, direct water flowing in through the direct water inlet 610 sequentially passes the direct water inlet hole 111a, and the direct water passing holes 121a, 211a, 221a, and 311a.

Simultaneously, the direct water passes in parallel a space between the second irregular portion 316 of the second inner side plate 310 and the second irregular portion 326 and the second outer side plate 320, a space between the second irregular portion 216 of the first middle plate 210 and the second irregular portion 226 of the second middle plate 220, and a space between the second irregular portion 116 of the first outer side plate 110 and the second irregular portion 126 of the first inner side plate 120.

Thereafter, the direct water sequentially passes the first heating water passing holes 311c, 221c, 211c, and 121c, and the hot water outlet hole 111b to be hot water being heated, thereby being discharged through the hot water outlet 620 to move to the hot water supply heat exchange unit 80.

As described above, the direct water flows through the second heating medium flow channel while being separated from the flow channel in which the heating water flows, and thus it is undergone heat exchange with the combustion gas to become the hot water.

<Combustion Gas Flow Channel>

Figure 18:
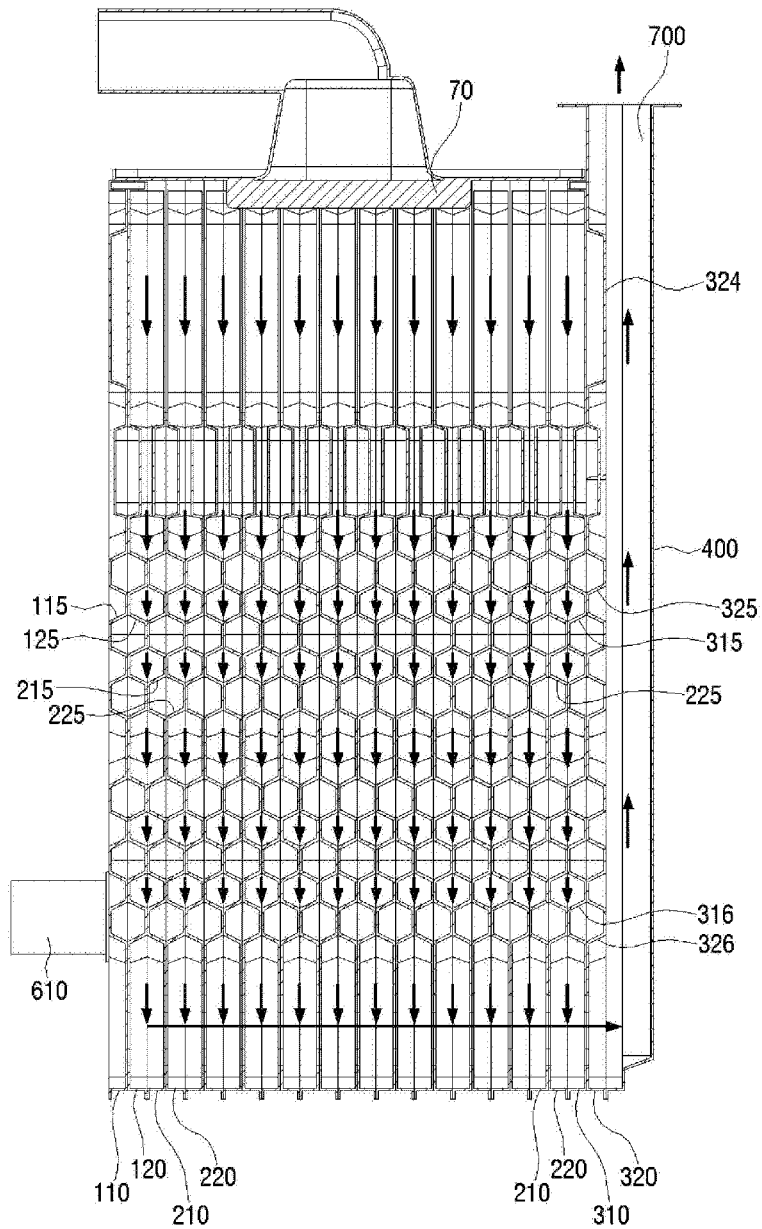
FIG. 18 is a cross-sectional view taken along line G-G of FIG. 4.
Figure 19:
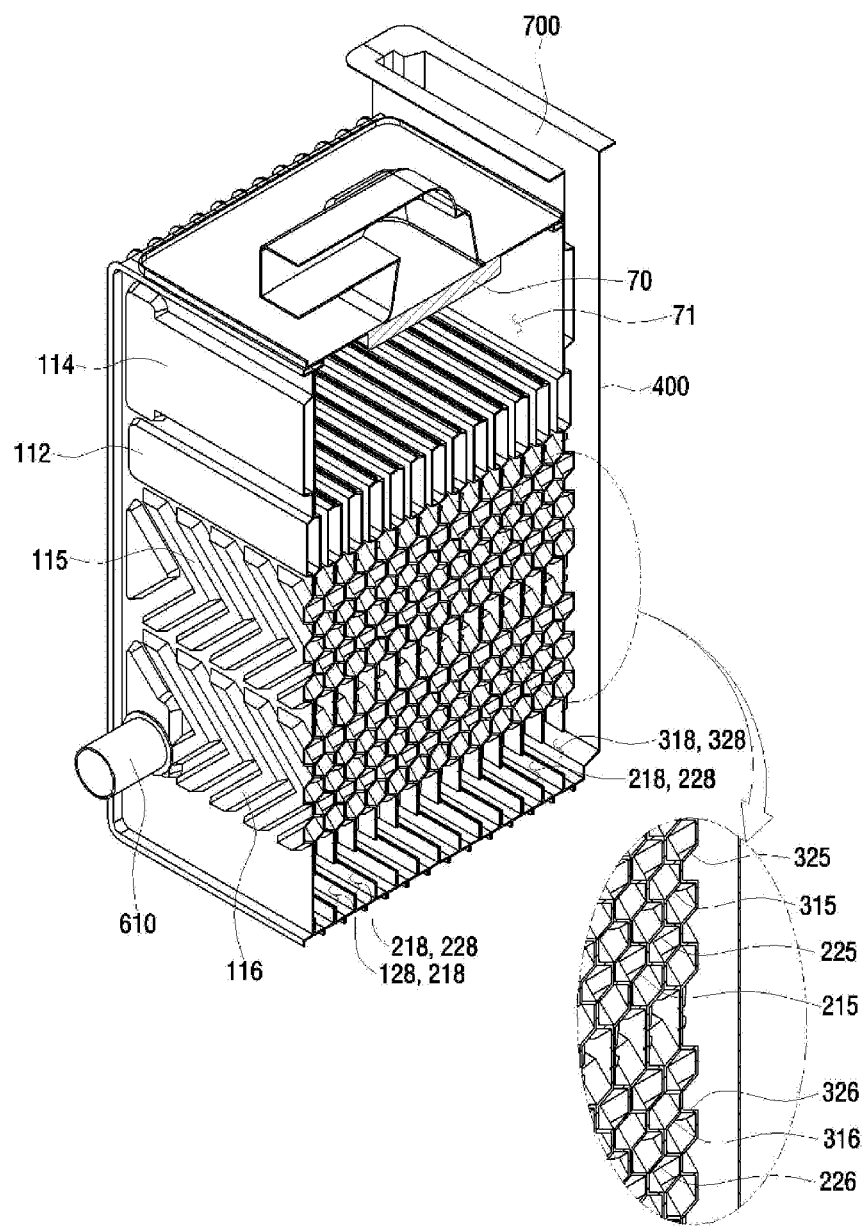
FIG. 19 is a perspective view of a cross section taken along line G-G of FIG. 4.

With reference to FIGS. 18 and 19, a combustion gas flow channel of the present disclosure will be described.

As shown in FIGS. 18 and 19, the combustion gas generated in the burner 70 flows downward through a space between the first end plate portion 100 and the middle plate portion 200 adjacent thereto, a space between the plurality of middle plate portions 200 adjacent thereto, and a space between the second end plate portion 300 and the middle plate portion 200 adjacent thereto.

In this case, the combustion gas passes spaces between the first irregular portions 115, 125, 215, 225, 315, and 325 which are crossed against each other in the zigzag pattern, and a turbulent flow of the combustion gas is formed during such a process and thus heat exchange efficiency with the heating water is improved.

A flow direction of the combustion gas flowing downward as described above is switched by 90 degrees, and thus the combustion gas flows in a right direction of FIG. 18. In this case, the combustion gas passes the combustion gas communicating holes 128, 218, 228, 318, and 328 and then flows in a space between the exhaust plate 400 and the second outer side plate 320, thereby being discharged to the outside through the combustion gas discharge unit 700.

The condensed water generated during such a process is discharged to the outside through the condensed water outlet 650.

Although a downward combustion type gas boiler has been described, the present disclosure may be applicable to an upward combustion type gas boiler.

As described above, the present disclosure is not limited to the described embodiment, and it should be construed that modifications can be apparently devised by those skilled in the art without departing from the technical spirit of this disclosure defined by the appended claims, and also such modifications will fall within the scope of this disclosure.

The invention claimed is:

1. A heat exchanger comprising:
heat exchange units 1100, 1200, and 1300 configured to exchange heat between combustion gas generated at a burner 70 burning a mixture and first and second heating media, and in which a heating medium flow channel and a combustion gas flow channel are alternately formed to be adjacent to each other in each of spaces between a plurality of plates 110, 120, 210, 220, 310, and 320, wherein the first and second heating media flow through the heating medium flow channel, and the combustion gas flows through the combustion gas flow channel; and
a combustion gas discharge unit 700 configured to discharge the combustion gas that passed the heat exchange units 1100, 1200, and 1300,
wherein the heating medium flow channel includes a first heating medium latent heat flow channel through which the first heating media flows, a first heating medium sensible heat flow channel which is communicated with the first heating medium latent heat flow channel and a second heating medium flow channel through which the second heating media flows,
wherein the heat exchange units 1100, 1200, and 1300 are configured with a first heat exchange unit 1100 including the first heating medium sensible heat flow channel that is formed between a pair of plates facing each other of the plurality of plates 110, 120, 210, 220, 310, and 320 so as to absorb sensible heat of the combustion gas to heat the first heating medium, a second heat exchange unit 1200 including the first heating medium latent heat flow channel that is formed between the pair of plates so as to absorb latent heat of the combustion gas to heat the first heating medium, and a third heat exchange unit 1300 including the second heating medium flow channel that is formed between the pair of plates so as to absorb the latent heat of the combustion gas to heat the second heating medium, and
wherein the first to third heat exchange units 1100, 1200, and 1300 are integrally formed by the pair of plates.

2. The heat exchanger of claim 1, wherein the first heat exchange unit 1100, the second heat exchange unit 1200, and the third heat exchange unit 1300 are sequentially provided along a flow direction of the combustion gas generated at the burner.

3. The heat exchanger of claim 2, wherein the plurality of plates 110, 120, 210, 220, 310, and 320 are configured with a first end plate portion 100 configuring one side of the heat exchanger 1000, a second end plate portion 300 configuring the other side of the heat exchanger 1000, and a plurality of middle plate portions 200 provided between the first end plate portion 100 and the second end plate portion 300, wherein the first end plate portion 100, the second end plate portion 300 and the plurality of middle plate portions 200 each include a pair of plates respectively, and wherein the first heating medium sensible heat flow channel, the first heating medium latent heat flow channel, and the second heating medium flow channel are formed between the pair of plates,
wherein the first end plate portion 100 is configured with a first outer side plate 110 and a first inner side plate 120 which are bonded with each other at edge circumferences thereof, the middle plate portion 200 is configured with a first middle plate 210 and a second middle plate 220 which are bonded with each other at edge circumferences thereof, and the second end plate portion 300 is configured with a second inner side plate 310 and a second outer side plate 320 which are bonded with each other at edge circumferences thereof, and
wherein the first heating medium sensible heat flow channel and the first heating medium latent heat flow channel of the second end plate portion 300 are communicated with each other, and are separated from the second heating medium flow channel.

4. The heat exchanger of claim 3, wherein the first heating medium is heating water supplied to a heating required zone, and flows in a heating water inlet hole 111*c* formed at the first outer side plate 110, sequentially passes heating water passing holes 121*c*, 121*d*, 211*c*, 211*d*, 221*c*, 221*d*, 311*c*, and 311*d*, which are formed at positions corresponding to the first inner side plate 120, the first and second middle plates 210 and 220, the second inner side plate 310, and the heating water inlet hole 111*c*, respectively, to be undergone heat exchange in the second heat exchange unit 1200, and then a flow direction of the first heating medium is switched to an opposite direction by means of the second outer side plate 320 and the heating water of the switched flow direction is undergone heat exchange while passing a heating medium flow channel formed at the first heat exchange unit 1100 and then is discharged through a heating water outlet hole 111*d* formed at the first outer side plate 110, and the second heating medium is direct water for supplying hot water to a user, and flows in a direct water inlet hole 111*a* formed at the first outer side plate 110 to sequentially pass direct water passing holes 121*a*, 211*a*, and 221*a*, which are formed at positions corresponding to the first inner side plate 120, the first and second middle plates 210 and 220, the second inner side plate 310, and the direct water passing hole 111*a*, and then a flow direction of the second heating medium is switched to an opposite direction by means of the second outer side plate 320 and the direct water of the switched flow direction sequentially passes hot water passing holes 311*b*, 221*b*, 211*b*, and 121*b*, which are formed at the second inner side plate 310, the second and first middle plates 220 and 210, and the first inner side plate 120, respectively, and then is discharged to a hot water supply heat exchange unit through a hot water outlet hole 111*b* of the first outer side plate 110 formed at positions corresponding to the hot water passing holes 311*b*, 221*b*, 211*b*, and 121*b*.

5. The heat exchanger of claim 4, wherein a flow channel connecting portion 329 is formed at a position corresponding to a heating water passing hole 311*d* of the second inner side plate 310 in a space between the second inner side plate 310 and the second outer side plate 320, so as to connect a first heating medium sensible heat flow channel of the third heat exchange unit 1300 and a first heating medium latent heat flow channel of the second heat exchange unit 1200 to each other.

6. The heat exchanger of claim 5, wherein lower sensible heat flow channel protruding portions 322, 312, 222, 212, 122, and 112 are horizontally formed at positions corresponding to the second outer side plate 320, the second inner side plate 310, the second middle plate 220, the first middle plate 210, the first inner side plate 120, and the first outer side plate 110, respectively, an end of an upper part of the flow channel connecting portion 329 is connected in a space between lower sensible heat flow channel protruding portions 322 and 312 of the second outer side plate 320 and the second inner side plate 310, and the first heating medium having the switched flow direction by means of the lower sensible heat flow channel protruding portion 322 of the second outer side plate 320 flows in a space between lower sensible heat flow channel protruding portions 122 and 112 of the first inner side plate 120 and the first outer side plate 110 via a lower sensible heat flow channel that is a space between lower sensible heat flow channel protruding portions 222 and 212 of the second middle plate 220 and the first middle plate 210.

7. The heat exchanger of claim 6, wherein occluded portions 312a, 222a, 212a, and 122a and through holes 312b, 222b, 212b, and 122b are formed at both ends of each of the lower sensible heat flow channel protruding portions 312, 222, 212, and 122, respectively, wherein the lower sensible heat flow channel protruding portions 312, 222, 212, and 122 are formed at the second inner side plate 310, the second middle plate 220, the first middle plate 210, and the first inner side plate 120, respectively, and, in the plurality of middle plate portions 200, the occluded portion and the through hole are formed at the same position at a pair of plates facing each other, respectively, so as to form the combustion gas flow channel, and the occluded portion and the through hole are formed to be opposite to each other at a pair of plates facing each other so as to form the first heating medium sensible heat flow channel, and thus the lower sensible heat flow channel has a zigzag shape.

8. The heat exchanger of claim 7, wherein both ends of the lower sensible heat flow channel protruding portion 112 of the first outer side plate 110 are occluded, a sensible heat flow channel connecting portion 113 is vertically formed at an opposite side end of the through hole 122b in the lower sensible heat flow channel protruding portion 112, and an upper part of the sensible heat flow channel connecting portion 113 is connected to an upper sensible heat flow channel having a flow direction opposite to that of the lower sensible heat flow channel.

9. The heat exchanger of claim 8, wherein first upper flow channel through holes 123, 213, 223, and 313 and second upper flow channel through holes 124, 214, 224, and 314 are formed at both ends of an upper part of each of the lower sensible heat flow channel protruding portions 122, 212, 222, 312, and 322, respectively, and the upper sensible heat flow channel is configured with a flow channel in which the first upper flow channel through holes 123, 213, 223, and 313 are connected to each other and a flow channel in which the second upper flow channel through holes 124, 214, 224, and 314 are connected to each other.

10. The heat exchanger of claim 9, wherein a first upper sensible heat flow channel protruding portion 114 is formed over the lower sensible heat flow channel protruding portion 112 at the first outer side plate 110, wherein one end of the first upper sensible heat flow channel protruding portion 114 is occluded and the heating water outlet hole 111d is formed at the other end thereof, and a second upper sensible heat flow channel protruding portion 324 having both ends being occluded is formed over the lower sensible heat flow channel protruding portion 322 at the second outer side plate 320, and thus a flow direction of the first heating medium flowing through the first upper flow channel through holes 123, 213, 223, and 313 is opposite that of the first heating medium flowing through the second upper flow channel through holes 124, 214, 224, and 314.

11. The heat exchanger of claim 4, wherein the direct water inlet hole 111a and the direct water passing holes 121a, 211a, 221a, and 311a are formed at one side lower part of the third heat exchange unit 1300 and the hot water outlet hole 111b and the hot water passing holes 121b, 211b, 221b, and 311b are formed at the other side upper part thereof, wherein the one side lower part is diagonally opposite the other side upper part, and the heating water passing holes 121c, 121d, 211c, 211d, 221c, 221d, 311c, and 311d are configured with first heating water passing holes 121c, 211c, 221c, and 311c and second heating water passing holes 121d, 211d, 221d, and 311d which are diagonally formed at one side lower part of the second heat exchange unit 1200 and the other side upper part thereof.

12. The heat exchanger of claim 5, wherein one side of the first heating medium latent heat flow channel and the other side thereof are formed to be communicated with the first heating water passing holes 121c, 211c, 221c, and 311c and the second heating water passing holes 121d, 211d, 221d, and 311d, and one side of the second heating medium flow channel and the other side thereof are formed to be communicated with the direct water passing holes 121a, 211a, 221a, and 311a, and the hot water passing holes 121b, 211b, 221b, and 311b.

13. The heat exchanger of claim 3, wherein combustion gas communicating holes 128, 218, 228, 318, and 328 are formed below the first inner side plate 120, the first middle plate 210, the second middle plate 220, the second inner side plate 310, and the second outer side plate 320, wherein the combustion gas, which passed the first to third heat exchangers 1100, 1200, and 1300, passes the combustion gas communicating holes 128, 218, 228, 318, and 328, the combustion gas discharge unit 700 is configured with a space between the second outer side plate 320 and an exhaust plate 400 that is provided in rear of the second outer side plate 320 and spaced apart therefrom, and the combustion gas, which sequentially passes the combustion gas flow channel and the combustion gas communicating holes 128, 218, 228, 318, and 328, is discharged through the space between the second outer side plate 320 and the exhaust plate 400.

14. The heat exchanger of claim 13, wherein a condensed water outlet 650 is provided at the first outer side plate 110 and is communicated with the combustion gas communicating holes 128, 218, 228, 318, and 328 to discharge condensed water generated by condensation of the combustion gas.

15. The heat exchanger of claim 3, wherein the plurality of plates 110, 120, 210, 220, 310, and 320 are bonded with adjacent plates at edge circumferences thereof, and the first heating medium sensible heat flow channel, the first heating medium latent heat flow channel, and the second heating medium flow channel are formed by a contact of flat portions of the adjacent plates and an irregular portion and a protruding portion which are formed at positions facing each other of the respective plates.

16. The heat exchanger of claim 15, wherein the irregular portion is configured with first irregular portions 115, 125, 215, 225, 315, and 325 for forming the first heating medium latent heat flow channel, and second irregular portions 116, 126, 216, 226, 316, and 326 for forming the second heating medium flow channel.

17. The heat exchanger of claim 16, wherein the irregular portions formed at adjacent plates among the plurality of plates 110, 120, 210, 220, 310, and 320 are symmetrically formed to cross against each other in a zigzag pattern.

* * * * *